United States Patent
Oelfke et al.

(10) Patent No.: US 9,732,675 B2
(45) Date of Patent: Aug. 15, 2017

(54) LOW EMISSION POWER GENERATION SYSTEMS AND METHODS

(75) Inventors: Russell H. Oelfke, Houston, TX (US); Moses Minta, Missouri City, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 467 days.

(21) Appl. No.: 13/702,541

(22) PCT Filed: Jun. 9, 2011

(86) PCT No.: PCT/US2011/039830
§ 371 (c)(1),
(2), (4) Date: Dec. 6, 2012

(87) PCT Pub. No.: WO2012/003080
PCT Pub. Date: Jan. 5, 2012

(65) Prior Publication Data
US 2013/0086916 A1    Apr. 11, 2013

Related U.S. Application Data

(60) Provisional application No. 61/361,180, filed on Jul. 2, 2010.

(51) Int. Cl.
*F02C 1/00* (2006.01)
*F02C 7/22* (2006.01)
(Continued)

(52) U.S. Cl.
CPC ............... *F02C 7/22* (2013.01); *F02C 6/003* (2013.01); *B01D 53/1475* (2013.01); *F02C 3/34* (2013.01);
(Continued)

(58) Field of Classification Search
CPC ......... Y02E 20/16; Y02C 10/04; Y02C 10/06; F05D 2260/61; F01K 23/10; F02C 3/34; B01D 53/1475; B01D 53/1425
See application file for complete search history.

(56) References Cited

U.S. PATENT DOCUMENTS 2,488,911 A    11/1949    Hepburn et al.
2,884,758 A    5/1959    Oberle
(Continued)

FOREIGN PATENT DOCUMENTS

CA    2231749    3/1998    ............... F23C 9/00
CA    2550675    7/2005    ............... F02C 3/34
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — Gerald L Sung
*Assistant Examiner* — Thomas Burke
(74) *Attorney, Agent, or Firm* — ExxonMobil Upstream Research Company Law Department

(57) ABSTRACT

Methods and systems for $CO_2$ separation for low emission power generation in combined-cycle power plants are provided. One system includes a gas turbine system that stoichiometrically combusts a fuel and an oxidant in the presence of a compressed recycle stream to provide mechanical power and a gaseous exhaust. The compressed recycle stream acts as a diluent to moderate the temperature of the combustion process. A boost compressor can boost the pressure of the gaseous exhaust before being compressed into the compressed recycle stream. A purge stream is tapped off from the compressed recycle stream and directed to a
(Continued)

$CO_2$ separator configured to absorb $CO_2$ from the purge stream using a potassium carbonate solvent.

30 Claims, 8 Drawing Sheets

(51) Int. Cl.
  *F02C 6/00* (2006.01)
  *F02C 3/34* (2006.01)
  *B01D 53/14* (2006.01)
(52) U.S. Cl.
  CPC .......... *F05D 2260/61* (2013.01); *Y02C 10/04* (2013.01); *Y02E 20/16* (2013.01)

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers ................ 60/39.51 |
| 3,841,382 A | 10/1974 | Gravis, III et al. ......... 159/16 R |
| 3,949,548 A | 4/1976 | Lockwood, Jr. |
| 4,018,046 A | 4/1977 | Hurley |
| 4,043,395 A | 8/1977 | Every et al. ................ 166/263 |
| 4,050,239 A | 9/1977 | Kappler et al. ............ 60/39.51 |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. ................ 431/9 |
| 4,165,609 A | 8/1979 | Rudolph |
| 4,171,349 A | 10/1979 | Cucuiat et al. ............ 423/574 |
| 4,198,378 A * | 4/1980 | Giammarco et al. ........ 423/220 |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest ................ 60/39.18 |
| 4,344,486 A | 8/1982 | Parrish ................ 166/272 |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman ................ 435/262 |
| 4,434,613 A | 3/1984 | Stahl ................ 60/39.7 |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby ................ 60/39.52 |
| 4,528,811 A * | 7/1985 | Stahl ................ 60/784 |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. ................ 62/24 |
| 4,762,543 A | 8/1988 | Pantermuehl et al. ............ 62/28 |
| 4,817,387 A | 4/1989 | Lashbrook |
| 4,858,428 A | 8/1989 | Paul ................ 60/39.17 |
| 4,895,710 A | 1/1990 | Hartmann et al. ............ 423/351 |
| 4,898,001 A | 2/1990 | Kuroda et al. |
| 4,946,597 A | 8/1990 | Sury |
| 4,976,100 A | 12/1990 | Lee ................ 60/39.02 |
| 5,014,785 A | 5/1991 | Puri et al. ................ 166/263 |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. ................ 166/252 |
| 5,098,282 A | 3/1992 | Schwartz et al. |
| 5,123,248 A | 6/1992 | Monty et al. ................ 60/740 |
| 5,135,387 A | 8/1992 | Martin et al. |
| 5,141,049 A | 8/1992 | Larsen et al. ................ 165/133 |
| 5,142,866 A | 9/1992 | Yanagihara et al. |
| 5,147,111 A | 9/1992 | Montgomery ................ 299/16 |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. ................ 166/268 |
| 5,344,307 A | 9/1994 | Schwartz et al. |
| 5,345,756 A | 9/1994 | Jahnke et al. ................ 60/39.02 |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. ................ 60/39.02 |
| 5,402,847 A | 4/1995 | Wilson et al. ................ 166/263 |
| 5,444,971 A | 8/1995 | Holenberger ................ 60/39.02 |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. ................ 60/39.23 |
| 5,542,840 A | 8/1996 | Surbey et al. |
| 5,566,756 A | 10/1996 | Chaback et al. ................ 166/263 |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. ................ 60/39.02 |
| 5,725,054 A | 3/1998 | Shayegi et al. ................ 166/263 |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. ................ 60/39.02 |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. ........ 208/390 |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |

(56) References Cited

U.S. PATENT DOCUMENTS

| | | |
|---|---|---|
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. ........ 60/39.23 |
| 6,089,855 A | 7/2000 | Becker et al. .................... 431/9 |
| 6,094,916 A | 8/2000 | Puri et al. |
| 6,101,983 A | 8/2000 | Anand et al. |
| 6,148,602 A | 11/2000 | Demetri ........................ 60/39.05 |
| 6,174,348 B1 | 1/2001 | Ahmed et al. ................. 95/160 |
| 6,183,241 B1 | 2/2001 | Bohn et al. |
| 6,201,029 B1 | 3/2001 | Waycuilis ..................... 518/703 |
| 6,202,400 B1 | 3/2001 | Utamura et al. ............. 60/39.03 |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon ............................. 60/649 |
| 6,263,659 B1 | 7/2001 | Dillon .......................... 60/39.02 |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. .................... 60/649 |
| 6,283,087 B1 | 9/2001 | Isaksen |
| 6,289,666 B1 | 9/2001 | Ginter .......................... 60/39.05 |
| 6,289,677 B1 | 9/2001 | Prociw et al. |
| 6,298,652 B1 | 10/2001 | Mittricker et al. .......... 60/39.02 |
| 6,298,654 B1 | 10/2001 | Vermes et al. ............... 60/39.02 |
| 6,298,664 B1 | 10/2001 | Asen et al. ...................... 60/649 |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. ................. 60/39.06 |
| 6,345,493 B1 | 2/2002 | Smith et al. ................. 60/39.02 |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. .................. 60/39.37 |
| 6,383,461 B1 | 5/2002 | Lang |
| 6,389,814 B2 | 5/2002 | Viteri et al. .................... 60/716 |
| 6,405,536 B1 | 6/2002 | Ho et al. ......................... 60/742 |
| 6,412,278 B1 | 7/2002 | Matthews |
| 6,412,302 B1 | 7/2002 | Foglietta |
| 6,412,559 B1 | 7/2002 | Gunter et al. ................. 166/271 |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones ..................... 166/250.01 |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. .................... 62/617 |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,508,209 B1 | 1/2003 | Collier ............................. 123/3 |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. ................ 60/775 |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,637,183 B2 | 10/2003 | Viteri et al. ............... 60/39.182 |
| 6,644,041 B1 | 11/2003 | Eyermann |
| 6,655,150 B1 | 12/2003 | Asen et al. ...................... 60/772 |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. ...................... 431/11 |
| 6,722,436 B2 | 4/2004 | Krill ............................. 166/303 |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. .................... 60/775 |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. .................... 431/8 |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. ............. 60/772 |
| 6,910,335 B2 | 6/2005 | Viteri et al. ..................... 60/786 |
| 6,923,915 B2 | 8/2005 | Alford et al. |
| 6,945,029 B2 | 9/2005 | Viteri ........................... 60/39.17 |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. .................... 60/716 |
| 7,056,482 B2 | 6/2006 | Hakka et al. |
| 7,059,152 B2 | 6/2006 | Oakey et al. |
| 7,065,953 B1 | 6/2006 | Kopko ............................ 60/39.3 |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. ................. 60/772 |
| 7,096,942 B1 | 8/2006 | de Rouffignac et al. |
| 7,097,925 B2 | 8/2006 | Keefer |

(56) References Cited

U.S. PATENT DOCUMENTS

| | | |
|---|---|---|
| 7,104,319 B2 | 9/2006 | Vinegar et al. |
| 7,104,784 B1 | 9/2006 | Hasegawa et al. |
| 7,124,589 B2 | 10/2006 | Neary ............................ 60/784 |
| 7,137,256 B1 | 11/2006 | Stuttaford et al. |
| 7,137,623 B2 | 11/2006 | Mockry et al. |
| 7,143,572 B2 | 12/2006 | Ooka et al. ................. 60/39.182 |
| 7,143,606 B2 | 12/2006 | Tranier |
| 7,146,969 B2 | 12/2006 | Weirich |
| 7,147,461 B2 | 12/2006 | Neary ............................... 431/5 |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,225,623 B2 | 6/2007 | Koshoffer |
| 7,237,385 B2 | 7/2007 | Carrea |
| 7,284,362 B2 | 10/2007 | Marin et al. ............... 60/39.182 |
| 7,299,619 B2 | 11/2007 | Briesch et al. |
| 7,302,801 B2 | 12/2007 | Chen |
| 7,305,817 B2 | 12/2007 | Blodgett et al. |
| 7,305,831 B2 | 12/2007 | Carrea et al. .................. 60/772 |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. ...................... 208/391 |
| 7,363,756 B2 | 4/2008 | Carrea et al. ................ 60/39.52 |
| 7,363,764 B2 | 4/2008 | Griffin et al. |
| 7,377,967 B2 | 5/2008 | Reddy et al. ................... 96/242 |
| 7,381,393 B2 | 6/2008 | Lynn |
| 7,401,577 B2 | 7/2008 | Saucedo et al. ........... 122/448.1 |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,472,550 B2 | 1/2009 | Lear et al. .................... 62/238.3 |
| 7,481,048 B2 | 1/2009 | Harmon et al. |
| 7,481,275 B2 | 1/2009 | Olsvik et al. .................. 166/303 |
| 7,482,500 B2 | 1/2009 | Johann et al. |
| 7,485,761 B2 | 2/2009 | Schindler et al. |
| 7,488,857 B2 | 2/2009 | Johann et al. |
| 7,491,250 B2 | 2/2009 | Hershkowitz et al. ....... 48/198.7 |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. .................. 60/774 |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. ...................... 62/643 |
| 7,520,134 B2 | 4/2009 | Durbin et al. |
| 7,536,252 B1 | 5/2009 | Hibshman, II et al. |
| 7,536,873 B2 | 5/2009 | Nohlen ............................ 62/644 |
| 7,540,150 B2 | 6/2009 | Schmid et al. |
| 7,559,977 B2 | 7/2009 | Fleischer et al. ............... 95/236 |
| 7,562,519 B1 | 7/2009 | Harris et al. |
| 7,562,529 B2 | 7/2009 | Kuspert et al. |
| 7,566,394 B2 | 7/2009 | Koseoglu ...................... 208/309 |
| 7,574,856 B2 | 8/2009 | Mak |
| 7,591,866 B2 | 9/2009 | Bose |
| 7,594,386 B2 | 9/2009 | Narayanan et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,635,408 B2 | 12/2009 | Mak et al. |
| 7,637,093 B2 | 12/2009 | Rao ............................... 60/39.52 |
| 7,644,573 B2 | 1/2010 | Smith et al. |
| 7,650,744 B2 | 1/2010 | Varatharajan et al. ....... 60/39.12 |
| 7,654,320 B2 | 2/2010 | Payton ........................... 166/257 |
| 7,654,330 B2 | 2/2010 | Zubrin et al. |
| 7,655,071 B2 | 2/2010 | De Vreede |
| 7,670,135 B1 | 3/2010 | Zink et al. |
| 7,674,443 B1 | 3/2010 | Davis |
| 7,677,309 B2 | 3/2010 | Shaw et al. |
| 7,682,597 B2 | 3/2010 | Blumenfeld et al. |
| 7,690,204 B2 | 4/2010 | Drnevich et al. |
| 7,695,703 B2 | 4/2010 | Sobolevskiy et al. |
| 7,717,173 B2 | 5/2010 | Grott |
| 7,734,408 B2 | 6/2010 | Shiraki |
| 7,749,311 B2 | 7/2010 | Saito et al. |
| 7,752,848 B2 | 7/2010 | Balan et al. .................... 60/780 |
| 7,752,850 B2 | 7/2010 | Laster et al. .................... 60/794 |
| 7,753,039 B2 | 7/2010 | Harima et al. |
| 7,762,084 B2 | 7/2010 | Martis et al. ................... 60/792 |
| 7,763,163 B2 | 7/2010 | Koseoglu |
| 7,763,227 B2 | 7/2010 | Wang |
| 7,765,810 B2 | 8/2010 | Pfefferle ......................... 60/777 |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,824,179 B2 | 11/2010 | Hasegawa et al. |
| 7,827,794 B1 | 11/2010 | Pronske et al. |
| 7,841,186 B2 | 11/2010 | So et al. |
| 7,845,406 B2 | 12/2010 | Nitschke |
| 7,861,511 B2 | 1/2011 | Chillar et al. |
| 7,874,350 B2 | 1/2011 | Pfefferle |
| 7,882,692 B2 | 2/2011 | Pronske et al. |
| 7,886,522 B2 | 2/2011 | Kammel |
| 7,906,304 B2 | 3/2011 | Kohr |
| 7,914,749 B2 | 3/2011 | Carstens et al. |
| 7,918,906 B2 | 4/2011 | Zubrin et al. |
| 7,922,871 B2 | 4/2011 | Price et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,166,766 B2 | 5/2012 | Draper |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |

(56) References Cited

U.S. PATENT DOCUMENTS

| | | |
|---|---|---|
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,337,613 B2 | 12/2012 | Zauderer |
| 8,347,600 B2 | 1/2013 | Wichmann et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,627,643 B2 | 1/2014 | Chillar et al. |
| 2001/0000049 A1 | 3/2001 | Kataoka et al. |
| 2001/0015061 A1 | 8/2001 | Viteri et al. ............... 60/39.161 |
| 2001/0029732 A1 | 10/2001 | Bachmann |
| 2001/0045090 A1 | 11/2001 | Gray, Jr. |
| 2002/0036086 A1 | 3/2002 | Minkkinen et al. .......... 166/266 |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0166323 A1 | 11/2002 | Marin et al. ..................... 60/775 |
| 2002/0187449 A1 | 12/2002 | Doebbeling et al. |
| 2003/0000436 A1 | 1/2003 | Havlena ........................ 110/347 |
| 2003/0005698 A1 | 1/2003 | Keller |
| 2003/0056517 A1 | 3/2003 | Brushwood et al. |
| 2003/0131582 A1 | 7/2003 | Anderson et al. ............ 60/39.55 |
| 2003/0134241 A1 | 7/2003 | Marin et al. ....................... 431/9 |
| 2003/0221409 A1 | 12/2003 | McGowan .................... 60/39.17 |
| 2003/0235529 A1 | 12/2003 | Hershkowitz et al. ........ 423/652 |
| 2004/0006994 A1 | 1/2004 | Walsh et al. |
| 2004/0068981 A1 | 4/2004 | Siefker et al. |
| 2004/0128975 A1 | 7/2004 | Viteri ............................ 60/39.55 |
| 2004/0148941 A1 | 8/2004 | Wylie ............................... 60/772 |
| 2004/0154793 A1 | 8/2004 | Zapadinski .................... 166/256 |
| 2004/0166034 A1 | 8/2004 | Kaefer |
| 2004/0170558 A1 | 9/2004 | Hershkowitz .................. 423/652 |
| 2004/0170559 A1 | 9/2004 | Hershkowitz et al. ........ 423/652 |
| 2004/0175326 A1 | 9/2004 | Hershkowitz et al. ........ 423/652 |
| 2004/0180973 A1 | 9/2004 | Hershkowitz .................. 518/703 |
| 2004/0191166 A1 | 9/2004 | Hershkowitz et al. ........ 423/652 |
| 2004/0206091 A1 | 10/2004 | Yee et al. ......................... 60/777 |
| 2004/0219079 A1 | 11/2004 | Hagen et al. ................... 422/194 |
| 2004/0223408 A1 | 11/2004 | Mathys et al. |
| 2004/0238654 A1 | 12/2004 | Hagen et al. |
| 2004/0241505 A1 | 12/2004 | Hershkowitz et al. .......... 429/17 |
| 2005/0022499 A1 | 2/2005 | Belokon et al. ............. 60/39.511 |
| 2005/0028529 A1 | 2/2005 | Bartlett et al. ................... 60/772 |
| 2005/0123874 A1 | 6/2005 | Abbasi et al. .................. 431/351 |
| 2005/0132713 A1 | 6/2005 | Neary ............................... 60/784 |
| 2005/0137269 A1 | 6/2005 | Hershkowitz et al. ........ 518/702 |
| 2005/0144961 A1 | 7/2005 | Colibaba-Evulet et al. ... 60/780 |
| 2005/0154068 A1 | 7/2005 | Hershkowitz et al. ........ 518/703 |
| 2005/0186130 A1 | 8/2005 | Hughes et al. ................. 423/219 |
| 2005/0197267 A1 | 9/2005 | Zaki et al. ..................... 510/245 |
| 2005/0201929 A1 | 9/2005 | Hershkowitz et al. ........ 423/652 |
| 2005/0229585 A1 | 10/2005 | Webster |
| 2005/0236602 A1 | 10/2005 | Viteri et al. ................... 252/372 |
| 2006/0005542 A1 | 1/2006 | Campbell et al. ............... 60/723 |
| 2006/0112675 A1 | 6/2006 | Anderson et al. |
| 2006/0112696 A1* | 6/2006 | Lynghjem .............. B01D 53/62 60/772 |
| 2006/0127827 A1 | 6/2006 | Yoshida et al. ..................... 431/8 |
| 2006/0158961 A1 | 7/2006 | Ruscheweyh et al. |
| 2006/0183009 A1 | 8/2006 | Berlowitz et al. ............... 429/19 |
| 2006/0188760 A1 | 8/2006 | Hershkowitz et al. .......... 429/17 |
| 2006/0196812 A1 | 9/2006 | Beetge et al. .................. 208/435 |
| 2006/0231252 A1 | 10/2006 | Shaw et al. .................. 166/272.3 |
| 2006/0248888 A1 | 11/2006 | Geskes |
| 2006/0260290 A1 | 11/2006 | Rao ............................... 60/39.53 |
| 2007/0000242 A1 | 1/2007 | Harmon et al. |
| 2007/0006565 A1 | 1/2007 | Fleischer et al. ............... 60/39.5 |
| 2007/0006592 A1* | 1/2007 | Balan et al. ..................... 60/772 |
| 2007/0034171 A1* | 2/2007 | Griffin .................. F01K 21/047 122/479.1 |
| 2007/0044475 A1 | 3/2007 | Leser et al. |
| 2007/0044479 A1 | 3/2007 | Brandt et al. .................... 60/783 |
| 2007/0089425 A1 | 4/2007 | Motter et al. |
| 2007/0107430 A1 | 5/2007 | Schmid et al. |
| 2007/0125063 A1 | 6/2007 | Evulat .......................... 60/39.15 |
| 2007/0130957 A1 | 6/2007 | Hoffman et al. ................ 60/780 |
| 2007/0144747 A1 | 6/2007 | Steinberg ...................... 166/402 |
| 2007/0144940 A1 | 6/2007 | Hershkowitz et al. ........ 208/107 |
| 2007/0178035 A1 | 8/2007 | White et al. ................... 423/248 |
| 2007/0220864 A1 | 9/2007 | Haugen .......................... 60/286 |
| 2007/0227156 A1 | 10/2007 | Saito et al. ....................... 60/772 |
| 2007/0231233 A1 | 10/2007 | Bose |
| 2007/0234702 A1 | 10/2007 | Hagen et al. |
| 2007/0237696 A1 | 10/2007 | Payton .......................... 423/228 |
| 2007/0240425 A1 | 10/2007 | Malavasi et al. ............... 60/775 |
| 2007/0245736 A1 | 10/2007 | Barnicki ......................... 60/670 |
| 2007/0249738 A1 | 10/2007 | Haynes et al. ................. 518/702 |
| 2007/0272201 A1 | 11/2007 | Amano et al. ................. 123/295 |
| 2007/0295640 A1 | 12/2007 | Tan et al. ......................... 208/22 |
| 2008/0000229 A1 | 1/2008 | Kuspert et al. |
| 2008/0006561 A1 | 1/2008 | Moran et al. .................... 208/45 |
| 2008/0010967 A1* | 1/2008 | Griffin et al. ................ 60/39.182 |
| 2008/0016868 A1 | 1/2008 | Ochs et al. ...................... 60/688 |
| 2008/0034727 A1 | 2/2008 | Sutikno |
| 2008/0038598 A1 | 2/2008 | Berlowitz et al. ............... 429/17 |
| 2008/0047280 A1 | 2/2008 | Dubar |
| 2008/0066443 A1 | 3/2008 | Frutschi et al. ............... 60/39.53 |
| 2008/0081938 A1* | 4/2008 | Schultz et al. ................. 585/648 |
| 2008/0083226 A1 | 4/2008 | Joshi et al. ...................... 60/772 |
| 2008/0092539 A1 | 4/2008 | Marshall et al. ................ 60/599 |
| 2008/0104938 A1 | 5/2008 | Finkenrath et al. ............. 60/39.5 |
| 2008/0104939 A1 | 5/2008 | Hoffman et al. ................ 60/39.5 |
| 2008/0104958 A1 | 5/2008 | Finkenrath et al. ......... 60/605.2 |
| 2008/0115478 A1 | 5/2008 | Sullivan |
| 2008/0115495 A1 | 5/2008 | Rising ............................. 60/731 |
| 2008/0118310 A1 | 5/2008 | Graham .................... 405/129.95 |
| 2008/0127632 A1 | 6/2008 | Finkenrath et al. ............ 60/274 |
| 2008/0141643 A1 | 6/2008 | Varatharajan et al. ......... 60/39.5 |
| 2008/0142409 A1 | 6/2008 | Sankaranarayanan et al. 208/62 |
| 2008/0155478 A1 | 7/2008 | Liu et al. ......................... 60/649 |
| 2008/0173584 A1 | 7/2008 | White et al. ................... 210/656 |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0275278 A1 | 11/2008 | Clark ............................. 585/240 |
| 2008/0290719 A1 | 11/2008 | Kaminsky et al. ............... 299/3 |
| 2008/0302107 A1 | 12/2008 | Fan et al. ........................ 60/783 |
| 2008/0309087 A1* | 12/2008 | Evulet ...................... F02C 3/34 290/52 |
| 2008/0317651 A1 | 12/2008 | Hooper et al. ................. 423/230 |
| 2009/0000762 A1 | 1/2009 | Wilson et al. |
| 2009/0038247 A1 | 2/2009 | Taylor et al. .................. 52/287.1 |
| 2009/0056342 A1 | 3/2009 | Kirzhner |
| 2009/0064653 A1 | 3/2009 | Hagen et al. .................... 60/39.3 |
| 2009/0071166 A1 | 3/2009 | Hagen et al. |
| 2009/0100754 A1 | 4/2009 | Gil ................................... 48/201 |
| 2009/0107141 A1 | 4/2009 | Chillar et al. |
| 2009/0117024 A1 | 5/2009 | Weedon et al. ............. 423/437.1 |
| 2009/0120087 A1 | 5/2009 | Sumser et al. |

(56) References Cited

U.S. PATENT DOCUMENTS

| | | | |
|---|---|---|---|
| 2009/0133400 A1 | 5/2009 | Callas | 60/730 |
| 2009/0145127 A1 | 6/2009 | Vollmer et al. | 60/618 |
| 2009/0151564 A1* | 6/2009 | Handagama et al. | 95/179 |
| 2009/0157230 A1 | 6/2009 | Hibshman, II et al. | |
| 2009/0193809 A1 | 8/2009 | Schroder et al. | 60/762 |
| 2009/0194280 A1 | 8/2009 | Gil et al. | 166/267 |
| 2009/0199566 A1 | 8/2009 | Lebas et al. | 60/772 |
| 2009/0205334 A1 | 8/2009 | Aljabari et al. | 60/605.2 |
| 2009/0218821 A1 | 9/2009 | ElKady et al. | 290/52 |
| 2009/0223227 A1 | 9/2009 | Lipinski et al. | |
| 2009/0229263 A1 | 9/2009 | Ouellet et al. | |
| 2009/0235637 A1 | 9/2009 | Foret | |
| 2009/0235671 A1 | 9/2009 | Rabovitser et al. | 60/806 |
| 2009/0241506 A1* | 10/2009 | Nilsson | F02C 9/28 60/39.24 |
| 2009/0250264 A1 | 10/2009 | Dupriest | 175/40 |
| 2009/0255242 A1 | 10/2009 | Paterson et al. | |
| 2009/0262599 A1 | 10/2009 | Kohrs et al. | |
| 2009/0284013 A1 | 11/2009 | Anand et al. | 290/52 |
| 2009/0301054 A1 | 12/2009 | Simpson et al. | 60/39.15 |
| 2009/0301099 A1 | 12/2009 | Nigro | 60/775 |
| 2010/0003123 A1 | 1/2010 | Smith | |
| 2010/0018218 A1 | 1/2010 | Riley et al. | 60/783 |
| 2010/0028142 A1 | 2/2010 | Hashimoto et al. | 415/200 |
| 2010/0058732 A1 | 3/2010 | Kaufmann et al. | |
| 2010/0064855 A1 | 3/2010 | Lanyi et al. | 75/458 |
| 2010/0077941 A1 | 4/2010 | D'Agostini | 110/188 |
| 2010/0077946 A1 | 4/2010 | D'Agostini | |
| 2010/0111784 A1* | 5/2010 | Mak et al. | 422/190 |
| 2010/0115960 A1 | 5/2010 | Brautsch et al. | 60/772 |
| 2010/0126176 A1 | 5/2010 | Kim | 60/748 |
| 2010/0162703 A1 | 7/2010 | Li et al. | 60/670 |
| 2010/0170253 A1 | 7/2010 | Berry et al. | |
| 2010/0180565 A1 | 7/2010 | Draper | 60/39.52 |
| 2010/0229720 A1* | 9/2010 | Sonwane et al. | 95/46 |
| 2010/0300102 A1 | 12/2010 | Bathina et al. | |
| 2010/0310439 A1 | 12/2010 | Brok et al. | 423/222 |
| 2010/0314136 A1 | 12/2010 | Zubrin et al. | 166/402 |
| 2010/0322759 A1 | 12/2010 | Tanioka | |
| 2010/0326084 A1 | 12/2010 | Anderson et al. | 60/775 |
| 2011/0000221 A1 | 1/2011 | Minta et al. | 60/783 |
| 2011/0000671 A1 | 1/2011 | Hershkowitz et al. | |
| 2011/0023488 A1 | 2/2011 | Fong et al. | 60/659 |
| 2011/0027018 A1 | 2/2011 | Baker et al. | 405/128.6 |
| 2011/0036082 A1 | 2/2011 | Collinot | |
| 2011/0048002 A1 | 3/2011 | Taylor et al. | |
| 2011/0048010 A1 | 3/2011 | Balcezak et al. | |
| 2011/0072779 A1 | 3/2011 | ELKady et al. | |
| 2011/0088379 A1 | 4/2011 | Nanda | |
| 2011/0107916 A1* | 5/2011 | Inoue | B01D 53/1418 96/242 |
| 2011/0110759 A1 | 5/2011 | Sanchez et al. | |
| 2011/0126512 A1 | 6/2011 | Anderson | |
| 2011/0138766 A1 | 6/2011 | ELKady et al. | |
| 2011/0162353 A1 | 7/2011 | Vanvolsem et al. | |
| 2011/0205837 A1 | 8/2011 | Gentgen | |
| 2011/0219777 A1 | 9/2011 | Wijmans et al. | 60/772 |
| 2011/0226010 A1 | 9/2011 | Baxter | |
| 2011/0227346 A1 | 9/2011 | Klenven | |
| 2011/0239653 A1 | 10/2011 | Valeev et al. | |
| 2011/0250120 A1* | 10/2011 | Tsubone | B01D 53/1425 423/437.1 |
| 2011/0262328 A1* | 10/2011 | Wijmans et al. | 423/210 |
| 2011/0265445 A1* | 11/2011 | Botero et al. | 60/39.182 |
| 2011/0265447 A1 | 11/2011 | Cunningham | |
| 2011/0289899 A1* | 12/2011 | De La Cruz Garcia | F01K 17/04 60/39.182 |
| 2011/0300493 A1 | 12/2011 | Mittricker et al. | |
| 2012/0023954 A1 | 2/2012 | Wichmann | |
| 2012/0023955 A1 | 2/2012 | Draper | |
| 2012/0023956 A1* | 2/2012 | Popovic | F02C 3/34 60/772 |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0085100 A1 | 4/2012 | Hughes et al. | |
| 2012/0090327 A1* | 4/2012 | Rofka | F01K 17/04 60/772 |
| 2012/0096870 A1 | 4/2012 | Wichmann et al. | |
| 2012/0119512 A1 | 5/2012 | Draper | |
| 2012/0144837 A1 | 6/2012 | Rasmussen et al. | |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1 | 10/2012 | Kraemer et al. | |
| 2013/0086916 A1 | 4/2013 | Oelfke et al. | |
| 2013/0086917 A1 | 4/2013 | Slobodyanskiy et al. | |
| 2013/0091853 A1 | 4/2013 | Denton et al. | |
| 2013/0091854 A1 | 4/2013 | Gupta et al. | |
| 2013/0104562 A1 | 5/2013 | Oelfke et al. | |
| 2013/0104563 A1 | 5/2013 | Oelfke et al. | |
| 2013/0125554 A1 | 5/2013 | Mittricker et al. | |
| 2013/0125555 A1 | 5/2013 | Mittricker et al. | |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2014/0000271 A1 | 1/2014 | Mittricker et al. | |
| 2014/0000273 A1 | 1/2014 | Mittricker et al. | |
| 2014/0007590 A1 | 1/2014 | Huntington et al. | |
| 2014/0013766 A1 | 1/2014 | Mittricker et al. | |
| 2014/0020398 A1 | 1/2014 | Mittricker et al. | |

FOREIGN PATENT DOCUMENTS

| | | | |
|---|---|---|---|
| CA | 2645450 | 9/2007 | C01G 1/00 |
| CA | 2614669 | 12/2008 | B03B 9/02 |
| EP | 0453059 | 6/1994 | F01K 23/06 |
| EP | 0770771 | 5/1997 | |
| EP | 0654639 | 9/1998 | F23R 3/14 |
| GB | 0776269 | 6/1957 | |
| GB | 2117053 | 2/1983 | F02C 3/22 |
| GB | 2397349 | 7/2004 | F02C 3/22 |
| WO | WO95/21683 | 8/1995 | B01D 53/14 |
| WO | WO97/07329 | 2/1997 | F02C 6/00 |
| WO | WO99/06674 | 2/1999 | F01K 23/10 |
| WO | WO99/63210 | 12/1999 | F02C 3/34 |
| WO | WO2005/064232 | 7/2005 | F23C 6/04 |
| WO | WO2006/107209 | 10/2006 | F01K 23/00 |
| WO | WO2007/068682 | 6/2007 | E21B 43/16 |
| WO | WO2008/074980 | 6/2008 | C01B 3/38 |
| WO | WO2008142009 | 11/2008 | |
| WO | WO2008/155242 | 12/2008 | F02C 3/34 |
| WO | WO2009/120779 | 10/2009 | F02B 17/00 |
| WO | WO2009/121008 | 10/2009 | B01J 15/00 |
| WO | WO2010/044958 | 4/2010 | F02C 9/00 |
| WO | WO 2010044958 A1 * | 4/2010 | F23C 9/00 |
| WO | WO2010/066048 | 6/2010 | F22B 1/22 |
| WO | WO2010/141777 | 12/2010 | F02C 9/00 |
| WO | WO2011003606 | 1/2011 | |
| WO | WO2011/028322 | 3/2011 | E21B 43/40 |
| WO | WO2012/003076 | 1/2012 | F02C 7/08 |
| WO | WO2012/003077 | 1/2012 | F02C 6/00 |
| WO | WO2012/003078 | 1/2012 | F02C 3/34 |
| WO | WO2012/003079 | 1/2012 | F02C 3/34 |
| WO | WO2012/003080 | 1/2012 | F02C 6/00 |
| WO | WO2012/003489 | 1/2012 | F16K 3/28 |
| WO | WO2012/018457 | 2/2012 | F02C 3/20 |
| WO | WO2012/018458 | 2/2012 | F02C 3/00 |
| WO | WO2012128928 | 9/2012 | |

(56) References Cited

FOREIGN PATENT DOCUMENTS

| WO | WO2012128929 | 9/2012 |
|---|---|---|
| WO | WO2012170114 | 12/2012 |
| WO | PCT/RU2013/000162 | 2/2013 |
| WO | PCT/US2013/036020 | 4/2013 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," *KTH—Royal Institute of Technology*, Dept. of Chemical Engineering and Technology, 9 pgs.

Clark, Hal (2002) "Development of a Unique Gas Generator for a Non-Polluting Power Plant," *California Energy Commission Feasibility Analysis*, P500-02-011F, Mar. 2002, 42 pgs.

Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Ertesvag, I. S. et al. (2005) "Exergy Analysis of a Gas-Turbin Combined-Cycle Power Plant With Precombustion $CO_2$ Capture," Elsivier, 2004, pp. 5-39.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE 71749*, 10 pgs.

Reeves, S. R. (2003) "Enhanced Coalbed Methane Recovery," *SPE 101466-DL*, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium* (Tuscaloosa, AL) *Paper 0615*, 9 pgs.

Zhu, J. et al. (2002) "Recovery of Coalbed Methane by Gas Injection," *SPE 75255*, 15 pgs.

Air Separation Technology Ion Transport Membrane—Air Products 2008.

Air Separation Technology Ion Transport Membrane—Air Products 2011.

Foy, Kirsten et al. (2005) "Comparison of Ion Transport Membranes"—Fourth Annual Conference on Carbon Capture and Sequestration, DOE/NETL; May 2005, 11 pages.

Cho, J. H. et al. (2005) "Marrying LNG and Power Generation," *Energy Markets*; Oct./Nov. 2005; 10, 8; ABI/INFORM Trade & Industry, p. 28.

Ciulia, Vincent. About.com. Auto Repair. How the Engine Works. 2001-2003.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, Aug. 7-12, 1988, pp. 41-44.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.

Nanda, R. et al. (2007) "Utilizing Air Based Technologies as Heat Source for LNG Vaporization," presented at the $86^{th}$ Annual convention of the *Gas Processors of America* (GPA 2007), Mar. 11-14, 2007, San Antonio, TX.

Rosetta, M. J. et al. (2006) "Integrating Ambient Air Vaporization Technology with Waste Heat Recovery—A Fresh Approach to LNG Vaporization," presented at the $85^{th}$ annual convention of the *Gas Processors of America* (GPA 2006), Grapevine, Texas, Mar. 5-8, 2006.

U.S. Appl. No. 13/596,684, filed Aug. 28, 2012, Slobodyanskiy et al.

U.S. Appl. No. 14/066,579, filed Oct. 29, 2013, Huntington et al.

U.S. Appl. No. 14/066,551, filed Oct. 29, 2013, Minto.

U.S. Appl. No. 14/144,511, filed Dec. 30, 2013, Thatcher et al.

U.S. Appl. No. 14/067,559, filed Oct. 30, 2013, Lucas John Stoia et al.

U.S. Appl. No. 14/067,679, filed Oct. 30, 2013, Elizabeth Angelyn Fadde et al.

U.S. Appl. No. 14/067,714, filed Oct. 30, 2013, Carolyn Ashley Antoniono et al.

U.S. Appl. No. 14/067,726, filed Oct. 30, 2013, Carolyn Ashley Antoniono et al.

U.S. Appl. No. 14/067,731, filed Oct. 30, 2013, Carolyn Ashley Antoniono et al.

U.S. Appl. No. 14/067,739, filed Oct. 30, 2013, Carolyn Ashley Antoniono et al.

U.S. Appl. No. 14/067,797, filed Oct. 31, 2013, Anthony Wayne Krull et al.

U.S. Appl. No. 14/066,488, filed Oct. 29, 2013, Pramod K. Biyani et al.

U.S. Appl. No. 14/135,055, filed Dec. 19, 2013, Pramod K. Biyani et al.

U.S. Appl. No. 14/067,844, filed Oct. 30, 2013, John Farrior Woodall et al.

U.S. Appl. No. 14/067,486, filed Oct. 30, 2013, Huntington et al.

(56) References Cited

OTHER PUBLICATIONS

U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

* cited by examiner

LOW EMISSION POWER GENERATION SYSTEMS AND METHODS

This application is the National Stage entry under 35 U.S.C. 371 of PCT/US2011/039830, that published as WO 2012/003080 and was filed on 9 Jun. 2011 which claims the benefit of U.S. Provisional Application No. 61/361,180, filed on 2 Jul. 2010, each of which is incorporated by reference, in its entirety, for all purposes.

This application contains subject matter related to PCT/US2011/042870, that published as WO 2012/003489 and was filed on 1 Jul. 2011; PCT/US2011/039824, that published as WO 2012/003076 and was filed on 9 Jun. 2011; PCT/US2011/039826, that published as WO 2012/003077 and was filed on 9 Jun. 2011; PCT/US2011/039828, that published as WO 2012/003078 and was filed on 9 Jun. 2011; and PCT/US2011/039829, that published as WO 2012/003079 and was filed on 9 Jun. 2011

FIELD OF THE DISCLOSURE

Embodiments of the disclosure relate to low emission power generation in combined-cycle power systems.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries make reducing $CO_2$ emissions a priority for these and other countries, as well as for the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_x$, and $NO_x$ components makes the use of amine solvent absorption very problematic. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process. Several studies have compared these processes and show some of the advantages of each approach. See, e.g. BOLLAND, OLAV, and UNDRUM, HENRIETTE, *Removal of $CO_2$ from Gas Turbine Power Plants: Evaluation of pre- and post-combustion methods*, SINTEF Group (1998).

Other approaches to lower $CO_2$ emissions include stoichiometric exhaust gas recirculation, such as in natural gas combined cycles (NGCC). In a conventional NGCC system, only about 40% of the air intake volume is required to provide adequate stoichiometric combustion of the fuel, while the remaining 60% of the air volume serves to moderate the temperature and cool the exhaust gas so as to be suitable for introduction into the succeeding expander. The additional air volume also disadvantageously generates excess oxygen in the exhaust, which is difficult to remove. The typical NGCC produces low pressure exhaust gas which requires a fraction of the power produced to extract the $CO_2$ for sequestration or EOR, thereby reducing the thermal efficiency of the NGCC. Further, the equipment for the $CO_2$ extraction is large and expensive, and several stages of compression are required to take the ambient pressure gas to the pressure required for EOR or sequestration. Such limitations are typical of post-combustion carbon capture from low pressure exhaust gas associated with the combustion of other fossil fuels, such as coal.

The foregoing discussion of need in the art is intended to be representative rather than exhaustive. A technology addressing one or more such needs, or some other related shortcoming in the field, would benefit power generation in combined-cycle power systems.

SUMMARY OF THE DISCLOSURE

The present disclosure provides systems and methods for generating power with an integrated $CO_2$ separation system. Exemplary systems include a gas turbine system, an exhaust gas recirculation system, a heat exchanger, and a $CO_2$ separator. The gas turbine system may have a combustion chamber configured to stoichiometrically combust a compressed oxidant and a fuel in the presence of a compressed recycle stream in order to generate a discharge stream, which is expanded in an expander, thereby generating a gaseous exhaust stream and at least partially driving a main compressor. The compressed recycle stream acts as a diluent configured to moderate the temperature of the discharge stream. The exhaust gas recirculation system may have at least one of a boost compressor and one or more cooling units configured to increase the mass flow rate of the gaseous exhaust stream to provide a cooled recycle gas to the main compressor. The main compressor compresses the cooled recycle gas and generates the compressed recycle stream, a portion of which is directed to the combustion chamber and a portion of which provides a purge stream. The $CO_2$ separator may be fluidly coupled to the purge stream and may comprise an absorber column, a first valve, and a regeneration column. The absorber column may be configured to receive the purge stream and circulate a potassium carbonate solvent therein to absorb $CO_2$ in the purge stream. The absorber column discharges a nitrogen-rich residual stream and a bicarbonate solvent solution. The first valve may be fluidly coupled to the absorber column and configured to flash the bicarbonate solvent solution to a near-atmospheric pressure. The regeneration column may be fluidly coupled to the first valve and configured to receive and boil the bicarbonate solvent solution to remove $CO_2$ and water therefrom, thereby producing a regenerated potassium carbonate solvent to be recirculated back to the absorber column.

The present disclosure further provides related systems and methods adapted to remove $CO_2$ from an exhaust gas recirculation stream.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION OF THE DISCLOSURE

Figure 1:
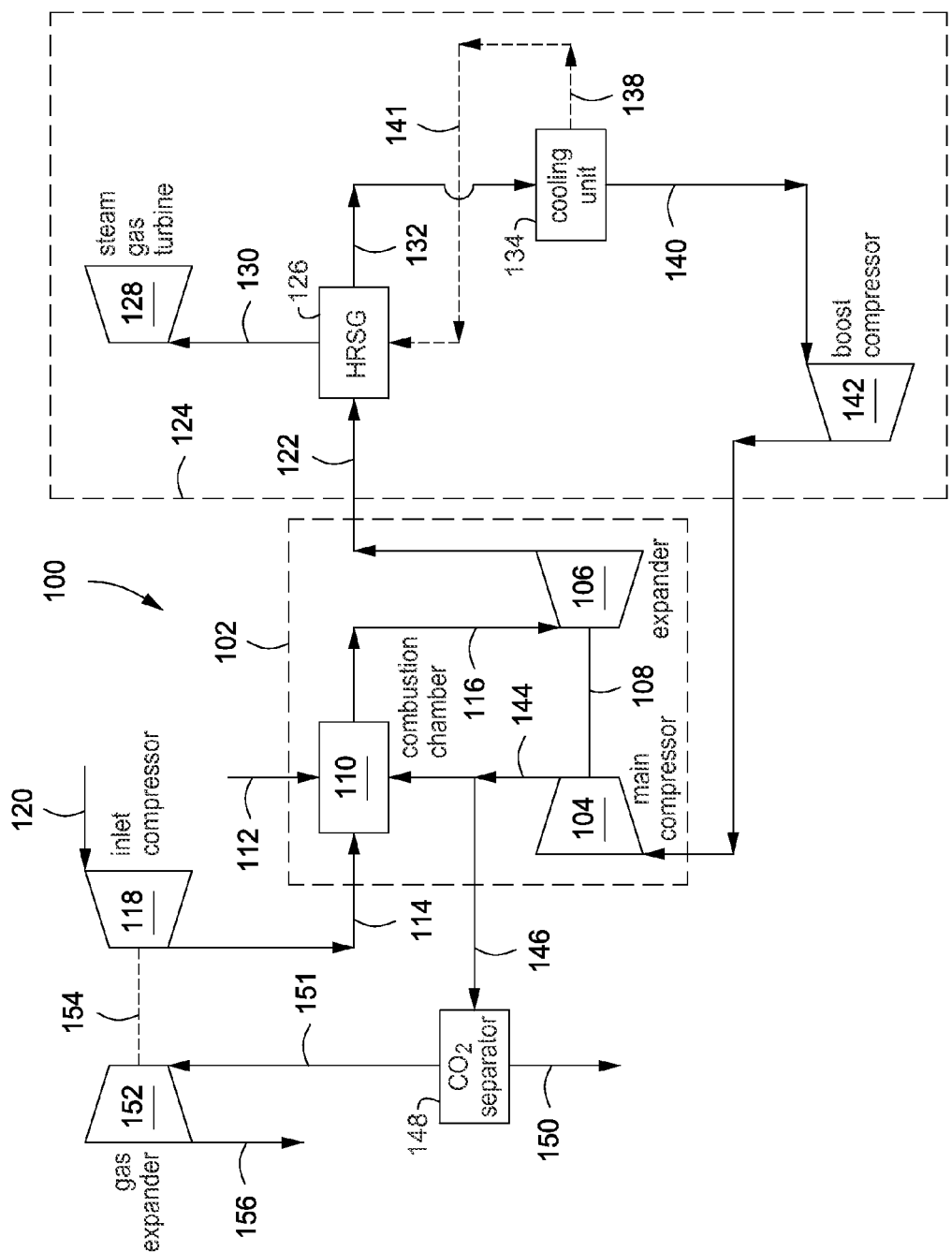
FIG. 1 depicts an integrated system for low emission power generation and enhanced $CO_2$ recovery, according to one or more embodiments of the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide, carbon dioxide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having a molar ratio of combustion fuel to oxygen ranging from about plus or minus 10% of the oxygen required for a stoichiometric ratio or more preferably from about plus or minus 5% of the oxygen required for the stoichiometric ratio. For example, the stoichiometric ratio of fuel to oxygen for methane is 1:2 ($CH_4 + 2O_2 \rightarrow CO_2 + 2H_2O$). Propane will have a stoichiometric ratio of fuel to oxygen of 1:5. Another way of measuring substantially stoichiometric combustion is as a ratio of oxygen supplied to oxygen required for stoichiometric combustion, such as from about 0.9:1 to about 1.1:1, or more preferably from about 0.95:1 to about 1.05:1.

Embodiments of the presently disclosed systems and processes may be used to produce ultra low emission electric power and $CO_2$ for enhanced oil recovery (EOR) or sequestration applications. According to embodiments disclosed herein, a mixture of air and fuel can be stoichiometrically or substantially stoichiometrically combusted and mixed with a stream of recycled exhaust gas. The stream of recycled exhaust gas, generally including products of combustion such as $CO_2$, can be used as a diluent to control or otherwise moderate the temperature of the stoichiometric combustion and exhaust gas entering the succeeding expander.

By cooling the exhaust gas and condensing the water out of the stream, a relatively high content $CO_2$ stream can be produced. While a portion of the recycled exhaust gas can be utilized for temperature moderation in the closed Brayton cycle, a remaining purge stream can be used for EOR applications and electric power can be produced with little or no $SO_X$, $NO_X$, or $CO_2$ being emitted to the atmosphere.

The stoichiometric or substantially stoichiometric combustion of the fuel combined with a boost in the pressure or other increase in the mass flow rate of the exhaust gas prior to being compressed for recirculation can make the $CO_2$ partial pressure much higher than in conventional gas turbine exhaust. As a result, carbon capture in a $CO_2$ separator can be undertaken using less energy-intensive solvents, such as potassium carbonate ($K_2CO_3$) or sodium carbonate ($Na_2CO_3$). The presence of oxygen ($O_2$), $SO_X$, and $NO_X$ in the exhaust gas make the use of amine solvents (e.g., MEA, DEA, MDEA, and related solvents) difficult, even with the higher pressure and increased $CO_2$ content, since amine solvents can degrade in their presence. The potassium or sodium carbonate solvents tolerate the minimal oxygen content of the present disclosure without degradation. Moreover, potassium carbonate easily absorbs $SO_X$ or $NO_X$, converting it to simple fertilizers such as potassium sulfite ($K_2SO_3$) and potassium nitrate ($KNO_3$). These fertilizers can be easily discharged in an environmentally harmless manner.

Referring now to the figures, FIG. 1 depicts a schematic of an illustrative integrated system 100 for power generation and $CO_2$ recovery using a combined-cycle arrangement, according to one or more embodiments. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel in line 112 mixed with a compressed oxidant in line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or combinations thereof. The compressed oxidant in line 114 can be derived from a second or inlet compressor 118 fluidly coupled to the combustion chamber 110 and adapted to compress a feed oxidant 120. In one or more embodiments, the feed oxidant 120 can include any suitable gas containing oxygen, such as air, oxygen-rich air, oxygen-depleted air, pure oxygen, or combinations thereof.

As will be described in more detail below, the combustion chamber 110 can also receive a compressed recycle stream 144, including an exhaust gas primarily having $CO_2$ and nitrogen components. The compressed recycle stream 144 can be derived from the main compressor 104 and adapted to help facilitate the stoichiometric or substantially stoichiometric combustion of the compressed oxidant in line 114 and fuel in line 112, and also increase the $CO_2$ concentration in the exhaust gas. An exhaust gas in line 116 can be generated as a product of combustion of the fuel in line 112 and the compressed oxidant in line 114, in the presence of the compressed recycle stream 144. The exhaust gas 116 is directed to the inlet of the expander 106. In at least one embodiment, the fuel in line 112 can be primarily natural gas, thereby generating an exhaust gas in line 116 including volumetric portions of vaporized water, $CO_2$, nitrogen, nitrogen oxides (NOx), and sulfur oxides ($SO_x$). In some embodiments, a small portion of unburned fuel or other compounds may also be present in the exhaust gas in line 116 due to combustion equilibrium limitations. As the exhaust gas in line 116 expands through the expander 106 it generates mechanical power to drive the main compressor 104, an electrical generator, or other facilities, and also produces a gaseous exhaust in line 122 having a heightened $CO_2$ content resulting from the influx of the compressed recycle exhaust gas in line 144.

The power generation system 100 can also include an exhaust gas recirculation (EGR) system 124. In one or more embodiments, the EGR system 124 can include a heat recovery steam generator (HRSG) 126, or similar device, fluidly coupled to a steam gas turbine 128. In at least one embodiment, the combination of the HRSG 126 and the steam gas turbine 128 can be characterized as a closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust in line 122 can be sent to the HRSG 126 in order to generate steam in line 130 and a cooled exhaust gas in line 132. In one embodiment, the steam in line 130 can be sent to the steam gas turbine 128 to generate additional electrical power.

The cooled exhaust gas in line 132 can be sent to any variety of apparatus and/or facilities in a recycle loop back to the main compressor 104. In the illustrated implementations, cooling units and/or booster compressors are shown and described in varying orders and configurations, each of which can be understood as being adapted to increase the mass flow rate of the cooled exhaust gas. By increasing the mass flow rate of the cooled exhaust gas entering the main compressor, a higher outlet pressure may be obtained from the main compressor.

In some implementations, and as shown in FIG. 1, the recycle loop may comprise at least one cooling unit 134 configured to reduce the temperature of the cooled exhaust gas in line 132 and generate a cooled recycle gas stream 140. In one or more embodiments, the cooling unit 134 can be a direct contact cooler, trim cooler, a mechanical refrigeration unit, or combinations thereof. The cooling unit 134 can also be configured to remove a portion of condensed water via a water dropout stream 138 which can, in at least one embodiment, be routed to the HRSG 126 via line 141 to provide a water source for the generation of additional steam in line 130. In one or more embodiments, the cooled recycle gas stream 140 can be directed to a boost compressor 142 fluidly coupled to the cooling unit 134. Cooling the cooled exhaust gas in line 132 in the cooling unit 134 can reduce the power required to compress the cooled recycle gas stream 140 in the boost compressor 142.

The boost compressor 142 can be configured to increase the pressure of the cooled recycle gas stream 140 before it is introduced into the main compressor 104. As opposed to a conventional fan or blower system, the boost compressor 142 increases the overall density of the cooled recycle gas stream 140, thereby directing an increased mass flow rate for the same volumetric flow to the main compressor 104. Because the main compressor 104 is typically volume-flow limited, directing more mass flow through the main compressor 104 can result in a higher discharge pressure from the main compressor 104, thereby translating into a higher pressure ratio across the expander 106. A higher pressure ratio generated across the expander 106 can allow for higher inlet temperatures and, therefore, an increase in expander 106 power and efficiency. This can prove advantageous since the $CO_2$-rich exhaust gas in line 116 generally maintains a higher specific heat capacity.

The main compressor 104 can be configured to compress the cooled recycle gas stream 140 received from the boost compressor 142 to a pressure nominally above the combustion chamber 110 pressure, thereby generating the compressed recycle stream 144. In at least one embodiment, a purge stream 146 can be tapped from the compressed recycle stream 144 and subsequently treated in a $CO_2$ separator 148 to capture $CO_2$ at an elevated pressure via line 150. The separated $CO_2$ in line 150 can be used for sales, used in another process requiring carbon dioxide, and/or compressed and injected into a terrestrial reservoir for enhanced oil recovery (EOR), sequestration, or another purpose.

Figure 2:
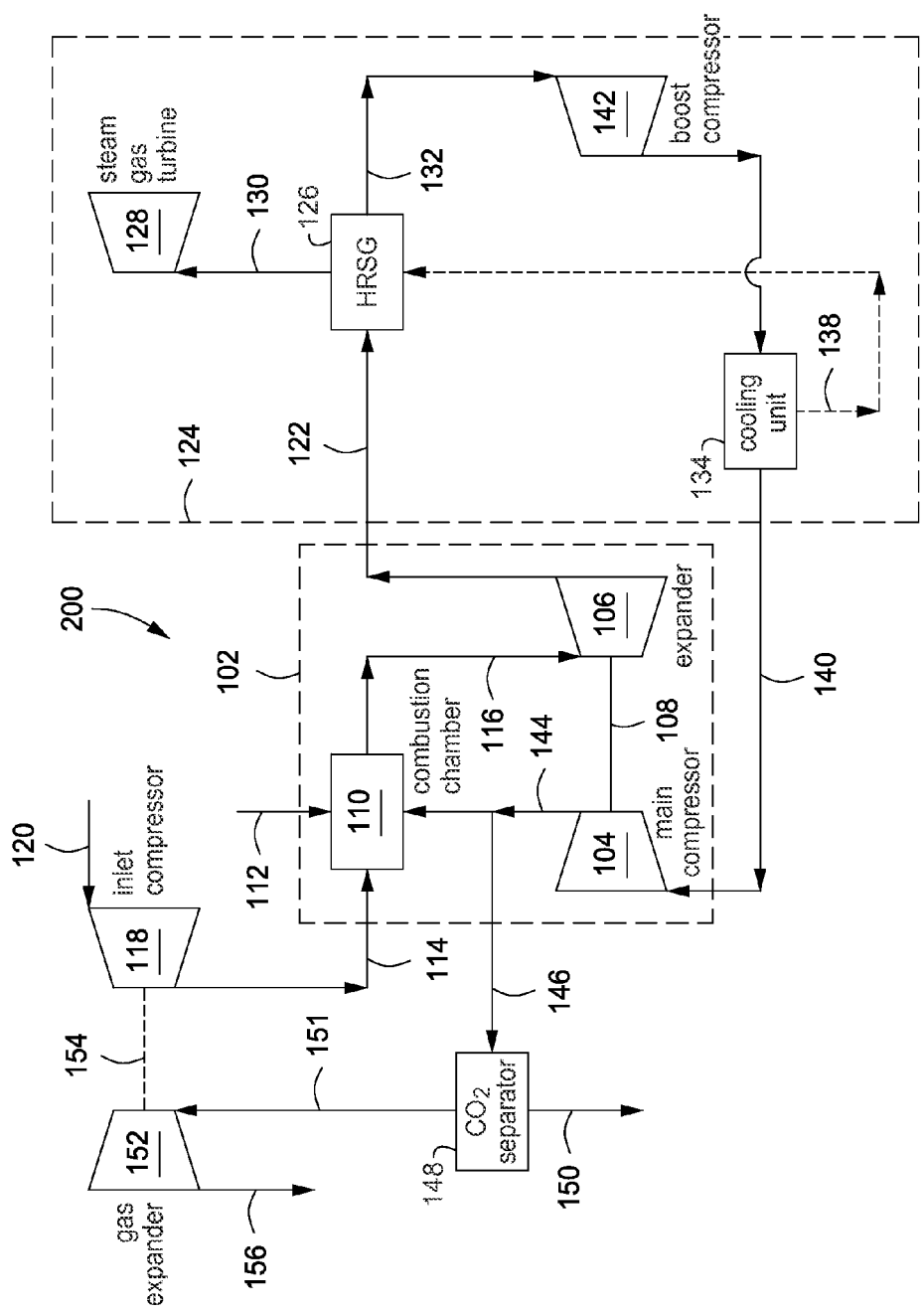
FIG. 2 depicts another integrated system for low emission power generation and enhanced $CO_2$ recovery, according to one or more embodiments of the present disclosure.
Figure 3:
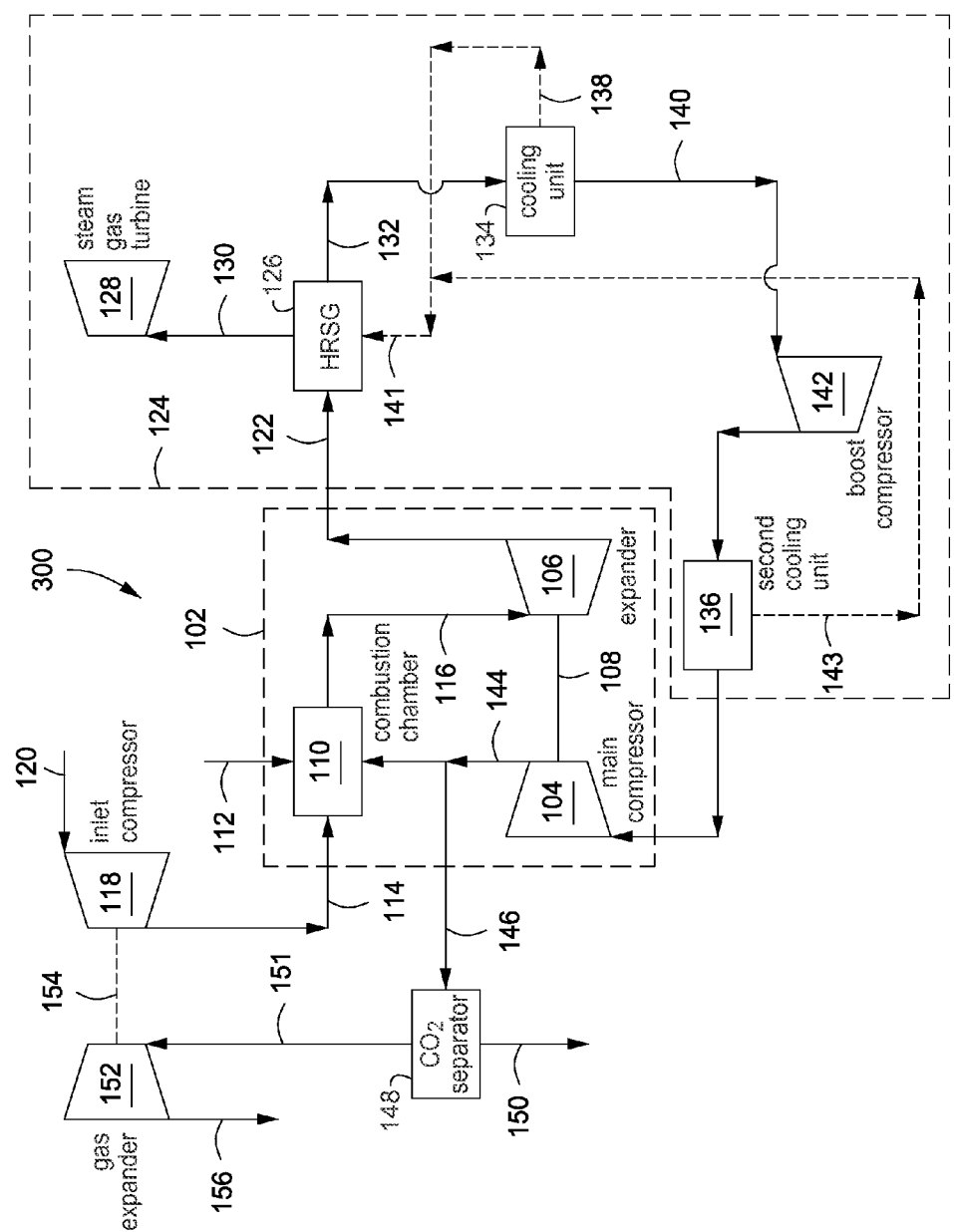
FIG. 3 depicts another integrated system for low emission power generation and enhanced oil recovery, according to one or more embodiments of the present disclosure.

A residual stream 151, essentially depleted of $CO_2$ and consisting primarily of nitrogen, can be derived from the $CO_2$ separator 148. In one or more embodiments, the residual stream 151 can be expanded in a gas expander 152, such as a power-producing nitrogen expander, fluidly coupled to the $CO_2$ separator 148. As depicted in FIGS. 1-3, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. After expansion in the gas expander 152, an exhaust gas in line 156, consisting primarily of nitrogen, can be vented to the atmosphere or implemented into other downstream applications known in the art. For example, the expanded nitrogen stream can be used in an evaporative cooling process configured to further reduce the temperature of the exhaust gas as generally described in the concurrently filed U.S.

patent application entitled "Stoichiometric Combustion with Exhaust Gas Recirculation and Direct Contact Cooler," the contents of which are hereby incorporated by reference to the extent not inconsistent with the present disclosure. In at least one embodiment, the combination of the gas expander 152, inlet compressor 118, and $CO_2$ separator can be characterized as an open Brayton cycle, or the third power producing component of the system 100.

Figure 8:
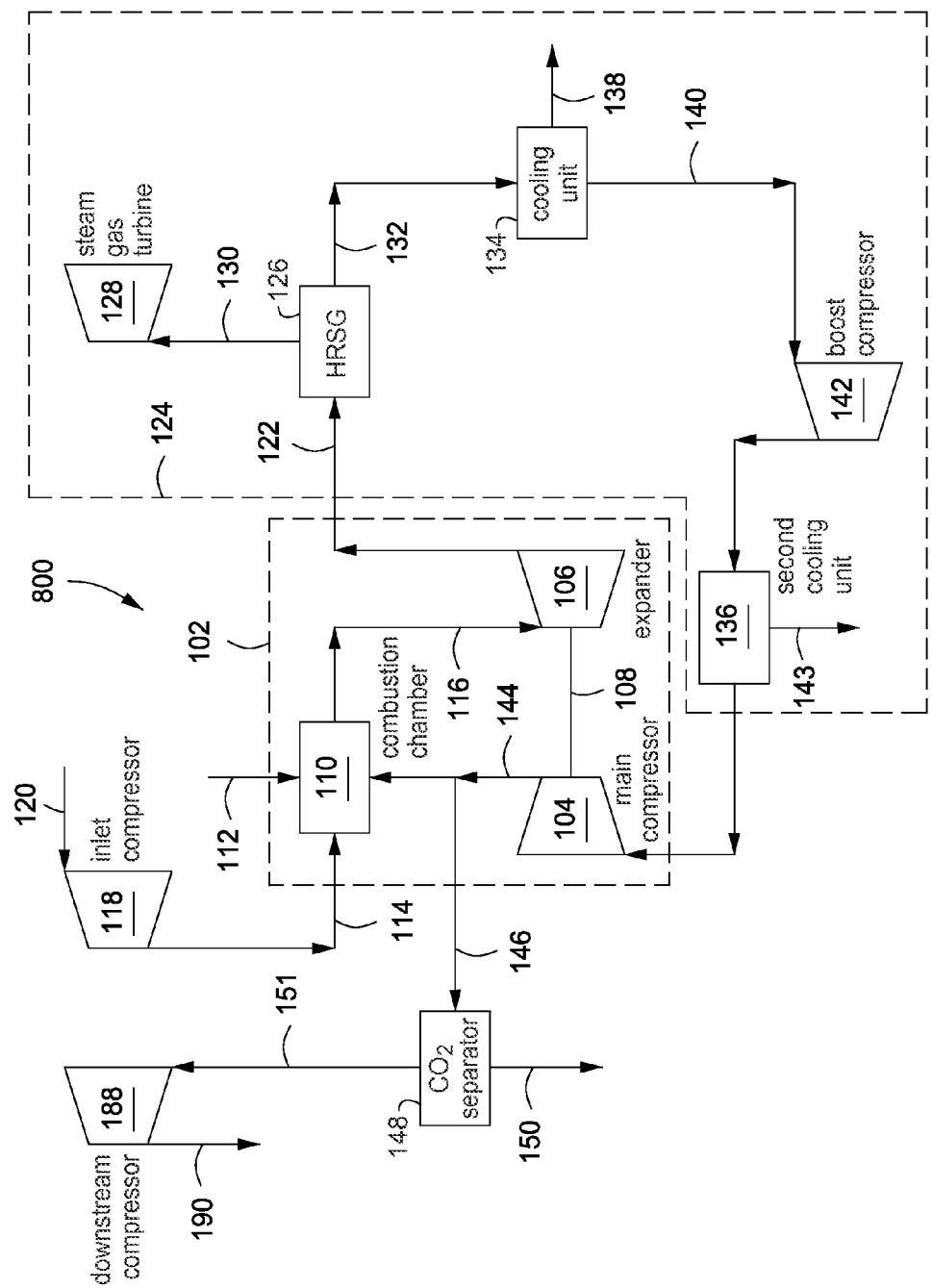
FIG. 8 depicts an integrated system for low emission power generation and nitrogen expansion for enhanced oil recovery, according to one or more embodiments of the present disclosure.

In other embodiments, however, the gas expander 152 can be used to provide power to other applications, and not directly coupled to the stoichiometric compressor 118. For example, there may be a substantial mismatch between the power generated by the expander 152 and the requirements of the compressor 118. In such cases, the expander 152 could be adapted to drive a smaller compressor (not shown) that demands less power. Additionally or alternatively, the expander 152 could be adapted to drive other equipment as appropriate. In yet other embodiments, as depicted in FIG. 8, the gas expander 152 can be replaced with a downstream compressor 188 configured to compress the residual stream 151 and generate a compressed exhaust gas in line 190. In one or more embodiments, the compressed exhaust gas in line 190 can be suitable for injection into a reservoir for pressure maintenance applications. In applications where methane gas is typically reinjected into hydrocarbon wells to maintain well pressures, compressing the residual stream 151 may prove advantageous. For example, the pressurized nitrogen gas in line 190 can instead be injected into the hydrocarbon wells and any residual methane gas can be sold or otherwise used as a fuel in related applications, such as providing fuel in line 112.

The EGR system 124 as described herein, especially with the addition of the boost compressor 142, can be implemented to achieve a higher concentration of $CO_2$ in the exhaust gas of the power generation system 100, thereby allowing for more effective $CO_2$ separation for subsequent sequestration, pressure maintenance, or EOR applications. For instance, embodiments disclosed herein can effectively increase the concentration of $CO_2$ in the exhaust gas stream to about 10 vol % or higher. To accomplish this, the combustion chamber 110 can be adapted to stoichiometrically combust the incoming mixture of fuel in line 112 and compressed oxidant in line 114. In order to moderate the temperature of the stoichiometric combustion to meet expander 106 inlet temperature and component cooling requirements, a portion of the exhaust gas derived from the compressed recycle stream 144 can be injected into the combustion chamber 110 as a diluent. Thus, embodiments of the disclosure can essentially eliminate any excess oxygen from the exhaust gas while simultaneously increasing its $CO_2$ composition. As such, the gaseous exhaust in line 122 can have less than about 3.0 vol % oxygen, or less than about 1.0 vol % oxygen, or less than about 0.1 vol % oxygen, or even less than about 0.001 vol % oxygen.

The specifics of exemplary operation of the system 100 will now be discussed. As can be appreciated, specific temperatures and pressures achieved or experienced in the various components of any of the embodiments disclosed herein can change depending on, among other factors, the purity of the oxidant used and the specific makes and/or models of expanders, compressors, coolers, etc. Accordingly, it will be appreciated that the particular data described herein is for illustrative purposes only and should not be construed as the only interpretation thereof. In an embodiment, the inlet compressor 118 can be configured as a stoichiometric compressor that provides compressed oxidant in line 114 at pressures ranging between about 280 psia and about 300 psia. Also contemplated herein, however, is aeroderivative gas turbine technology, which can produce and consume pressures of up to about 750 psia and more.

The main compressor 104 can be configured to recycle and compress recycled exhaust gas into the compressed recycle stream 144 at a pressure nominally above or at the combustion chamber 110 pressure, and use a portion of that recycled exhaust gas as a diluent in the combustion chamber 110. Because amounts of diluent needed in the combustion chamber 110 can depend on the purity of the oxidant used for stoichiometric combustion or the model of expander 106, a ring of thermocouples and/or oxygen sensors (not shown) can be disposed associated with the combustion chamber and/or the expander. For example, thermocouples and/or oxygen sensors may be disposed on the outlet of the combustion chamber 110, on the inlet to the expander 106 and/or on the outlet of the expander 106. In operation, the thermocouples and sensors can be adapted to determine the compositions and/or temperatures of one or more streams for use in determining the volume of exhaust gas required as diluent to cool the products of combustion to the required expander inlet temperature. Additionally or alternatively, the thermocouples and sensors may be adapted to determine the amount of oxidant to be injected into the combustion chamber 110. Thus, in response to the heat requirements detected by the thermocouples and the oxygen levels detected by the oxygen sensors, the volumetric mass flow of compressed recycle gas in line 144 and/or compressed oxidant in line 114 can be manipulated or controlled to match the demand. The volumetric mass flow rates may be controlled through any suitable flow control systems, which may be in electrical communication with the thermocouples and/or oxygen sensors.

In at least one embodiment, a pressure drop of about 12-13 psia can be experienced across the combustion chamber 110 during stoichiometric combustion. Combustion of the fuel in line 112 and the compressed oxidant in line 114 can generate temperatures between about 2000° F. and about 3000° F. and pressures ranging from 250 psia to about 300 psia. Because of the increased mass flow and higher specific heat capacity of the $CO_2$-rich exhaust gas derived from the compressed recycle stream 144, a higher pressure ratio can be achieved across the expander 106, thereby allowing for higher inlet temperatures and increased expander 106 power.

The gaseous exhaust in line 122 exiting the expander 106 can have a pressure at or near ambient. In at least one embodiment, the gaseous exhaust in line 122 can have a pressure of about 15.2 psia. The temperature of the gaseous exhaust in line 122 can range from about 1180° F. to about 1250° F. before passing through the HRSG 126 to generate steam in line 130 and a cooled exhaust gas in line 132. The cooled exhaust gas in line 132 can have a temperature ranging from about 190° F. to about 200° F. In one or more embodiments, the cooling unit 134 can reduce the temperature of the cooled exhaust gas in line 132 thereby generating the cooled recycle gas stream 140 having a temperature between about 32° F. and 120° F., depending primarily on wet bulb temperatures in specific locations and during specific seasons.

According to one or more embodiments, the boost compressor 142 can be configured to elevate the pressure of the cooled recycle gas stream 140 to a pressure ranging from about 17.1 psia to about 21 psia. Additionally or alternatively, the mass flow rate of the cooled recycle gas stream may be increased through other means, such as cooling. As a result, the main compressor 104 receives and compresses a recycled exhaust gas with a higher density and increased mass flow, thereby allowing for a substantially higher discharge pressure while maintaining the same or similar pressure ratio. In at least one embodiment, the temperature of the compressed recycle stream 144 discharged from the main compressor 104 can be about 800° F., with a pressure of around 280 psia.

The following table provides testing results and performance estimations based on combined-cycle gas turbines, with and without the added benefit of a boost compressor 142, as described herein.

TABLE 1

Triple-Cycle Performance Comparison

| Power (MW) | Recirc. Cycle w/o Boost Compressor | Recirc. Cycle w/ Boost Compressor |
|---|---|---|
| Gas Turbine Expander Power | 1055 | 1150 |
| Main Compressor | 538 | 542 |
| Fan or Boost Compressor | 13 | 27 |
| Inlet Compressor | 283 | 315 |
| Total Compression Power | 835 | 883 |
| Net Gas Turbine Power | 216 | 261 |
| Steam Turbine Net Power | 395 | 407 |
| Standard Machinery Net Power | 611 | 668 |
| Aux. Losses | 13 | 15 |
| Nitrogen Expander Power | 156 | 181 |
| Combined Cycle Power | 598 | 653 |
| Efficiency | | |
| Fuel Rate (mBTU/hr) | 5947 | 6322 |
| Heat Rate (BTU/kWh) | 9949 | 9680 |
| Combined Cycle Eff. (% lhv) | 34.3 | 35.2 |
| $CO_2$ Purge Pressure (psia) | 280 | 308 |

As should be apparent from Table 1, embodiments including a boost compressor 142 can result in an increase in expander 106 power (i.e., "Gas Turbine Expander Power") due to the increase in pressure ratios. Although the power demand for the main compressor 104 can increase, its increase is more than offset by the increase in power output of the expander 106, thereby resulting in an overall thermodynamic performance efficiency improvement of around 1% lhv (lower heated value).

Moreover, the addition of the boost compressor 142 or cooling in the exhaust gas recirculation system can also increase the power output of the nitrogen expander 152 and the $CO_2$ purge pressure in the purge stream 146 line. An increase in purge pressure of the purge stream 146 can lead to improved solvent treating performance in the $CO_2$ separator 148 due to the higher $CO_2$ partial pressure. Such improvements can include, but are not limited to, a reduction in overall capital expenditures in the form of reduced equipment size for the solvent extraction process.

Referring now to FIG. 2, depicted is an alternative embodiment of the power generation system 100 of FIG. 1, embodied and described as system 200. As such, FIG. 2 may be best understood with reference to FIG. 1. Similar to the system 100 of FIG. 1, the system 200 of FIG. 2 includes a gas turbine system 102 coupled to or otherwise supported by an exhaust gas recirculation (EGR) system 124. The EGR system 124 in FIG. 2, however, can include an embodiment where the boost compressor 142 follows or may otherwise be fluidly coupled to the HRSG 126. As such, the cooled exhaust gas in line 132 can be compressed in the boost compressor 142 before being reduced in temperature in the cooling unit 134. Thus, the cooling unit 134 can serve as an aftercooler adapted to remove the heat of compression generated by the boost compressor 142. As with previously disclosed embodiments, the water dropout stream 138 may or may not be routed to the HRSG 126 to generate additional steam in line 130.

The cooled recycle gas stream 140 can then be directed to the main compressor 104 where it is further compressed, as discussed above, thereby generating the compressed recycle stream 144. As can be appreciated, cooling the cooled exhaust gas in line 132 in the cooling unit 134 after compression in the boost compressor 142 can reduce the amount of power required to compress the cooled recycle gas stream 140 to a predetermined pressure in the succeeding main compressor 104.

FIG. 3 depicts another embodiment of the low emission power generation system 100 of FIG. 1, embodied as system 300. As such, FIG. 3 may be best understood with reference to FIGS. 1 and 2. Similar to the systems 100, 200 described in FIGS. 1 and 2, respectively, the system 300 includes a gas turbine system 102 supported by or otherwise coupled to an EGR system 124. The EGR system 124 in FIG. 3, however, can include a first cooling unit 134 and a second cooling unit 136, having the boost compressor 142 fluidly coupled therebetween. As with previous embodiments, each cooling unit 134, 136 can be a direct contact cooler, trim cooler, or the like, as known in the art.

In one or more embodiments, the cooled exhaust gas in line 132 discharged from the HRSG 126 can be sent to the first cooling unit 134 to produce a condensed water dropout stream 138 and a cooled recycle gas stream 140. The cooled recycle gas stream 140 can be directed to the boost compressor 142 in order to boost the pressure of the cooled recycle gas stream 140, and then direct it to the second cooling unit 136. The second cooling unit 136 can serve as an aftercooler adapted to remove the heat of compression generated by the boost compressor 142, and also remove additional condensed water via a water dropout stream 143. In one or more embodiments, each water dropout stream 138, 143 may or may not be routed to the HRSG 126 to generate additional steam in line 130.

The cooled recycle gas stream 140 can then be introduced into the main compressor 104 to generate the compressed recycle stream 144 nominally above or at the combustion chamber 110 pressure. As can be appreciated, cooling the cooled exhaust gas in line 132 in the first cooling unit 134 can reduce the amount of power required to compress the cooled recycle gas stream 140 in the boost compressor 142. Moreover, further cooling exhaust in the second cooling unit 136 can reduce the amount of power required to compress the cooled recycle gas stream 140 to a predetermined pressure in the succeeding main compressor 104.

The combination of stoichiometric combustion in the combustion chamber 110 and water removal through the cooling units 134, 136, allows the $CO_2$ content in the exhaust gas (e.g., streams 122, 132, 140, and/or 144) to accumulate to about 10 vol % or higher, which is higher than exhaust gases in conventional combined-cycle systems. These effects, plus the impact of higher mass flow rates resulting from the implementation and effect of the boost compressor 142 and/or cooling units, make the $CO_2$ partial pressure much higher than conventional gas turbine exhaust. Consequently, this allows for carbon capture in the $CO_2$ separator 148 using less energy-intensive solvents, such as potassium carbonate ($K_2CO_3$) solvent technology.

The presence of oxygen ($O_2$), $SO_X$, and $NO_X$ make the use of amine solvents (e.g., MEA, DEA, MDEA, and related solvents) difficult, even with the higher pressure and increased $CO_2$ content, since these gases can cause amine degradation. Potassium carbonate, however, is non-reactive and immune to any effects of oxygen. Although the reaction undertaken in the combustion chamber 110 is intended to be stoichiometric, a fraction of oxygen may nonetheless be present in the purge stream 146 due to combustion equilibrium limitations. While the use of MEA solvents in this application would require significant solvent reclamation and complicated disposal, the use of potassium carbonate solvents eliminates oxygen-based solvent degradation.

Potassium carbonate easily absorbs $SO_X$ or $NO_X$ in the exhaust gas, converting these compounds to simple fertilizers, such as potassium sulfite ($K_2SO_3$) and potassium nitrate ($KNO_3$). In particular, $SO_2$, $SO_3$, and $NO_2$ all form fairly strong acids in water, much stronger than $CO_2$. Thus, they will be preferentially absorbed in the solvent solution, but will become heat stable salts (HSS) and will not be removed by regeneration. On the other hand, NO and $N_2O$ have low solubility and are more difficult to absorb than $NO_2$, and tend to occur at lower concentrations. As simple fertilizers, the potassium sulfite and potassium nitrate can be easily discharged in an environmentally harmless manner, so long as no other toxic compounds, such as corrosion inhibitors, activators, etc., are added to the solvent system. When the sulfate and nitrate compounds are removed, potassium hydroxide (KOH) can be added for solvent makeup. Since potassium hydroxide is a fairly inexpensive chemical, this can be accomplished rather economically.

Figure 4:
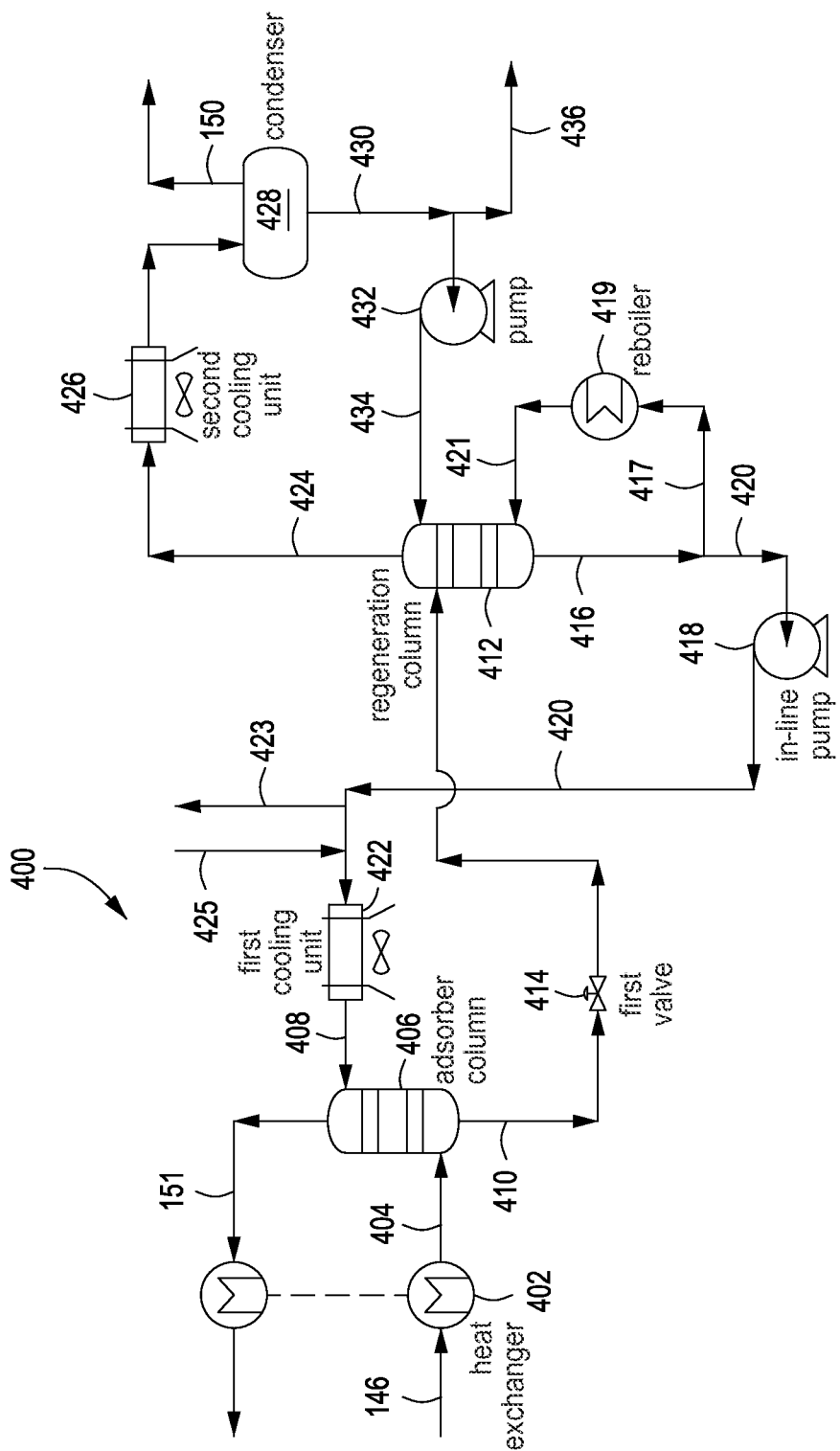
FIG. 4 depicts an illustrative $CO_2$ capture system, according to one or more embodiments of the present disclosure.

Referring to FIG. 4, depicted is an exemplary embodiment of a $CO_2$ separation system 400 that can employ potassium carbonate solvent technology as described herein. The $CO_2$ separation system 400 can be or form at least a portion of the $CO_2$ separator 148, as generally described herein with reference to FIGS. 1-3. In one or more embodiments, the system 400 can be configured to receive the purge stream 146 tapped from the compressed recycle stream 144 (FIGS. 1-3) at a temperature of around 800° F. and a pressures of around 270 psia to about 280 psia.

The purge stream 146, containing primarily nitrogen, $CO_2$, and excess combustion water, can be cooled in a heat exchanger 402 to a temperature ranging from about 250° F. to about 300° F., thereby generating a cooled purge stream in line 404. In an embodiment, the heat exchanger 402 can generate steam to be integrated with the steam stream 130 from the HRSG 126 (FIGS. 1-3). Extracting $CO_2$ from the purge stream 146 in the $CO_2$ separation system 400 generates a nitrogen-rich residual stream 151 at or near the elevated pressure of the purge stream 146 and at a temperature of about 150° F. In at least one embodiment, the heat exchanger 402 can be a cross-exchange heat exchanger fluidly coupled to the residual stream 151 and configured to extract the heat energy associated with cooling the purge stream 146 in order to re-heat the residual stream 151. Once reheated, the residual stream 151, consisting primarily of a nitrogen vapor having a temperature of about 750° F. and a pressure of around 270-280 psia, can be subsequently expanded to generate mechanical power, as generally described above.

The cooled purge stream in line 404 can be directed to an absorber column 406 where a solvent from line 408 is circulated, and the residual stream 151 is simultaneously discharged overhead for further downstream processing. In one embodiment, the solvent is a water-based salt solution of potassium carbonate. When compared to competing solvents, such as MEA, the potassium carbonate solvent is quite temperature-tolerant. As a result, the cooling of the purge stream 146 can be minimized, as needed, and a higher temperature purge stream 146 can be allowed to enter the absorber column 406 without raising thermal degradation concerns. Accordingly, the degree of cooling of the purge stream 146 can be modified to match process heat requirements, rather than cooling to avoid thermal degradation.

As $CO_2$ is absorbed by the potassium carbonate in the absorber column 406, it reacts with water to form carbonic acid ($H_2CO_3$), and then bicarbonate ($HCO_3^-$). The acidic part of the carbonic acid ($H^+$) can react with the carbonate ion ($CO_3^{-2}$) to form an additional bicarbonate ion. Thus, the overall reaction can be as follows:

$$CO_2 + H_2O + K_2CO_3 \leftrightarrow 2KHCO_3$$

As a result, a rich, bicarbonate solvent can be discharged from the bottom of the absorber column 406 via line 410 and directed to a regeneration column 412. In one embodiment, a first or intermediate valve 414 disposed in the line 410 can be configured to flash the bicarbonate solvent to a lower, near-atmospheric pressure before introduction to the regeneration column 412. In at least one embodiment, the first valve 414 can be a hydraulic turbine configured to generate extra power.

In at least one embodiment, the regeneration column 412 can operate at temperatures exceeding the normal boiling point of water. For example, the regeneration column 412 can operate at a temperature range from about 220° F., about 230° F., or about 240° F. to about 280° F., about 290° F., or about 300° F. The regeneration column 412 can operate at pressures ranging from about 0 psig to about 10 psig. In at least one embodiment, the regeneration column 412 can be configured to operate at a pressure of about 3 psig. The regeneration column 412 can be configured to use steam circulating therein to boil the bicarbonate solvent and reverse the reaction undertaken in the absorber column 406, thereby yielding a regenerated, lean potassium carbonate solvent suitable for recirculation via line 416 below. In at least one embodiment, an in-line pump 418, or the like, can drive at least a portion of the lean potassium carbonate solvent via line 420 back to the absorber column 406.

En route to the absorber column 406, a portion of the lean potassium carbonate solvent can be removed as a heat stable salt (HSS) via line 423. As described above, illustrative HSSs extracted via line 423 can include compound fertilizers such as, but not limited to, potassium sulfite and/or potassium nitrate. In order to make up for the loss of potassium carbonate content removed via line 423, and to maintain overall solution strength, a stream of potassium hydroxide can be subsequently added via line 425. In one or more embodiments, the potassium hydroxide serves as a solvent makeup. The lean potassium carbonate solvent in line 420 can then be optionally directed through a first cooling unit 422. In one or more embodiments, the first cooling unit 422 can be, for example, an air cooler or radiator-type heat exchanger, configured to reduce the temperature of the solvent. If used, the first cooling unit 422 can be configured to reduce the temperature of the lean potassium carbonate solvent to temperatures ranging between about 230° F. and about 60° F. As can be appreciated, in at least one embodiment the HSSs can alternatively be removed as fertilizers subsequent to the first cooling unit 422, as well as the addition of potassium hydroxide.

In order to generate the steam circulating in the regeneration column 412 and maintain the required heat of regeneration, at least a portion of the lean potassium carbonate solvent in line 416 can be directed to a reboiler 419 via line 417. The reboiler 419 can be configured to increase the temperature of the lean potassium carbonate solvent in line 417, and return a heated regenerated potassium carbonate solvent back to the regeneration column via line 421. In at least one embodiment, the reboiler 419 can be supplied with heat from the HRSG 126 (FIGS. 1-3). In other embodiments, however, the reboiler 419 can be supplied with heat from the discharge of the steam gas turbine 128 (FIGS. 1-3).

The water included in the purge stream 146 can condense into the solvent solution in the absorber column 406, and subsequently boil out in the regeneration column 412. Consequently, the regeneration column 412 can further discharge $CO_2$ vapor and any residual water via overhead line 424. In at least one embodiment, the $CO_2$ vapor and residual water can be directed through a second cooling unit 426, such as an air cooler or radiator-type heat exchanger, before being introduced into a condenser 428. The condenser 428 can be configured to separate the residual water from any recovered $CO_2$ and direct the separated water into line 430 below while feeding the recovered $CO_2$ into line 150 overhead. As can be appreciated, line 150 can be the same line 150 as described above with reference to FIGS. 1-3. In at least one embodiment, the separated $CO_2$ in line 150 can be subsequently compressed for applications such as $CO_2$ sequestration, enhanced oil recovery, $CO_2$ sales, carbon capture, and/or combinations thereof.

In one embodiment, at least a portion of the separated water in line 430 can be recirculated back into the regeneration column 412 via line 434 using a pump 432 to allow the balance of water in the system to be maintained constant. Water is constantly introduced into the solvent via stream 404, and subsequently removed via lines 436, 150, and 151. In order to maintain solvent conditions and strength, the water must remain in balance within the system 400. Accordingly, the water recirculated in line 434 can allow water to be returned so that steam raised in line 421 can be controlled independently of this water balance. In other words, this recirculated water can be used as feedwater for the generation of steam in the regeneration column 412 or to raise low pressure steam from feed cooling. In other embodiments, a portion of the residual water in line 430 can be disposed of as fresh process water via line 436. For example, although containing a portion of dissolved $CO_2$, the water in line 436 can be used for irrigation water, treated to be used for boiler feed water, and/or other process water.

Figure 5:
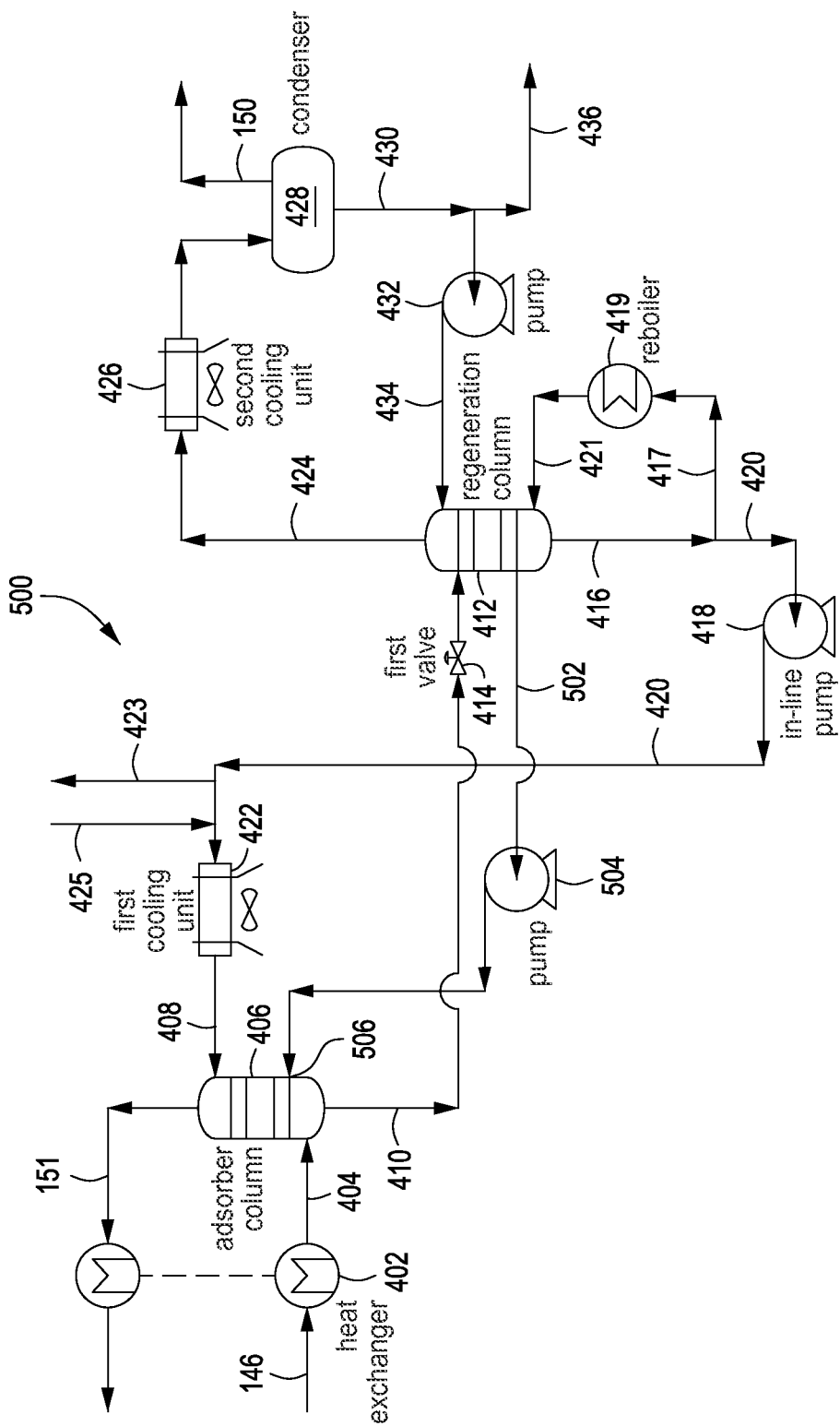
FIG. 5 depicts another illustrative $CO_2$ capture system, according to one or more embodiments of the present disclosure.

Referring now to FIG. 5, depicted is another illustrative embodiment of a $CO_2$ separation system 500, similar in some respects to the system 400 of FIG. 4. As such, the entire system 500 will not be described in detail but may be best understood with reference to FIG. 4. Whereas the system 400 of FIG. 4 could be characterized as a single-stage potassium carbonate process, the system 500 of FIG. 5 can be characterized, in at least one embodiment, as a two-stage potassium carbonate process. As depicted, the $CO_2$ separation system 500 can include a "semi-lean" solvent recirculation loop, wherein a portion of the solvent can be withdrawn from the regeneration column 412 via line 502 prior to complete regeneration. In at least one embodiment, the portion of the solvent withdrawn via line 502 can be about 50% or more of the total solvent volume circulating through the regeneration column 412. The balance of the solvent solution remaining in the regeneration column 412 can be fully regenerated, as described above, and discharged via line 416 therebelow.

A pump 504 disposed within line 502 can direct the semi-lean solvent solution to the absorber column 406. In one embodiment, the semi-lean solvent solution can be fed low 506 into the absorber column 406. Being only partially regenerated, the semi-lean solvent in line 502 is not able to absorb $CO_2$ from the lower concentration gases higher in the absorber column 406. Instead, it can be fed into the absorber column 406 where it can absorb the maximum amount of $CO_2$, and not dilute the fully lean solvent entering the absorber column 406 via line 408.

This variation in the system 500 can require a higher solvent circulation flowrate than the system 400 of FIG. 4, but can demand less external heat energy to remove the $CO_2$. With this improved thermal efficiency, the system 500 can require less reboiler 419 heat duty than is contained in the purge stream 146. In other words, the heat of the incoming purge stream 146 may be able to supply all the reboiler 419 heat requirements. Consequently, if the residual stream 151 is injected for EOR, the system 500 can be thermally self-sufficient and require no make-up heat from the power turbine HRSG 126.

Figure 6:
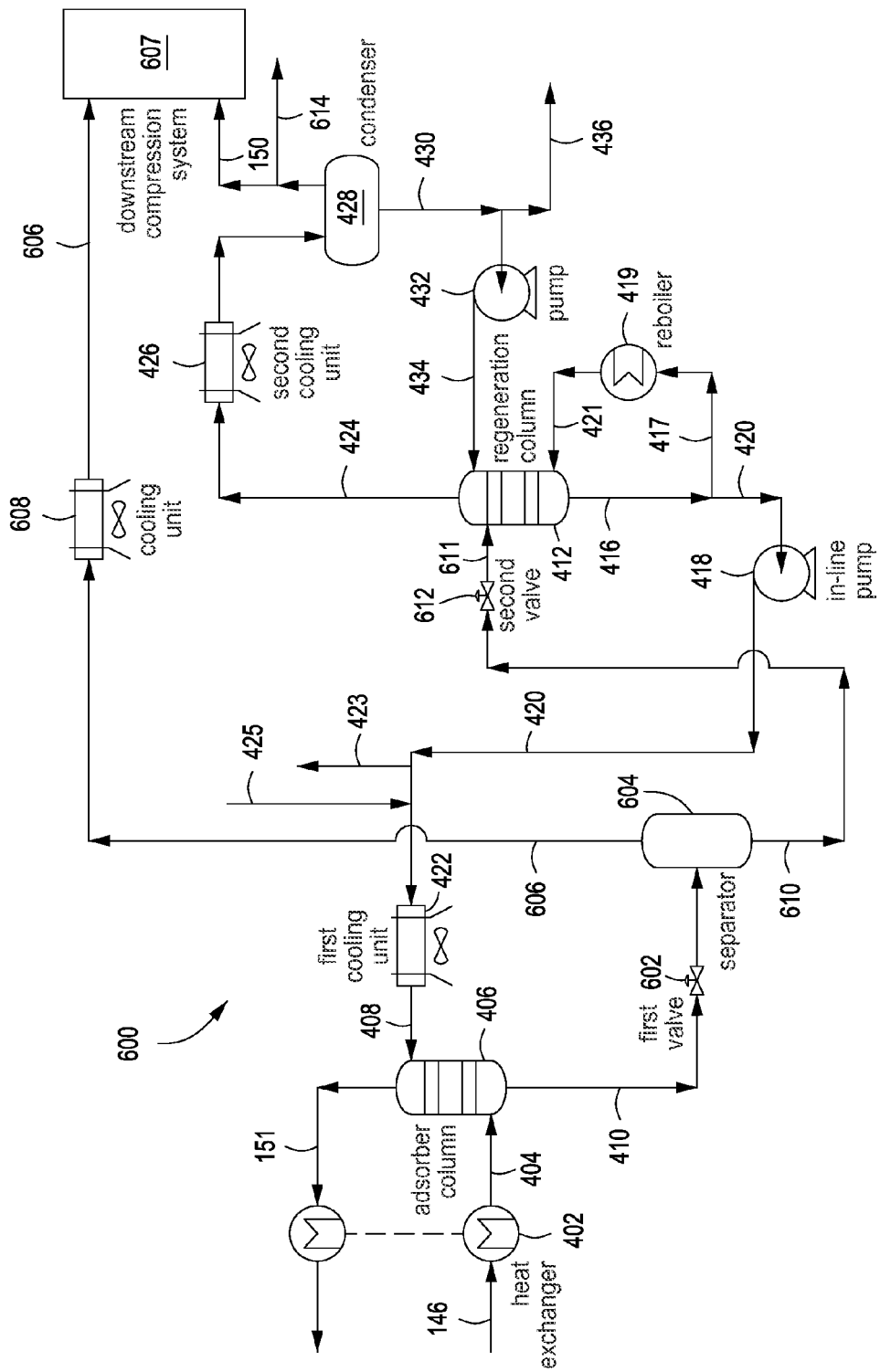
FIG. 6 depicts another illustrative $CO_2$ capture system, according to one or more embodiments of the present disclosure.

Referring now to FIG. 6, depicted is another exemplary embodiment of a $CO_2$ separation system 600, similar in some respects to the systems 400, 500 of FIGS. 4 and 5, respectively. As such, the entire system 600 will not be described in detail but may be best understood with reference to FIGS. 4 and 5. As depicted, the rich, bicarbonate solvent can be discharged from the bottom of the absorber column 406 via line 410 and reduced in pressure using a first valve 602 before being introduced into a separator 604. In one embodiment, the first valve 602 can be configured to reduce the pressure of the bicarbonate solvent from the purge stream 146 pressure (e.g., between about 270-280 psia) to an intermediate pressure level. In one or more embodiments, the intermediate pressure level can range from about 20 psia to about 50 psia.

The separator 604 can be configured to receive the reduced-pressure solution and remove at least a portion of $CO_2$ via overhead line 606. In one or more embodiments, the removed $CO_2$ in line 606 can be cooled in a cooling unit 608, and subsequently fed into a downstream compression system 607. In one or more embodiments, the cooling unit 608 can be a direct contact cooler, trim cooler, a mechanical refrigeration unit, or combinations thereof. Since the removed portion of $CO_2$ in line 606 is at an elevated pressure, albeit an intermediate pressure between the pressure of the purge stream 146 and atmospheric, it can be injected into an intermediate stage of the downstream compression system 607, thereby reducing the required compression load on the compression system 607.

The balance of the $CO_2$ and bicarbonate solvent remaining in the separator 604 can be discharged from the separator 604 via line 610 below and flashed to a lower, near-atmospheric pressure in stream 611 using a second valve 612 before being directed into the regeneration column 412. In several embodiments of the system 600, complete solvent regeneration can then take place as described above with reference to either system 400 or system 500 as depicted in FIG. 4 or 5, respectively. For instance, as described above a separated portion of $CO_2$ can be extracted from the condenser 428 via line 150 at or near atmospheric pressure and directed to a first compression stage of the downstream compression system 607. Consequently, the downstream compression system 607 can receive at least two feed streams substantially including captured $CO_2$; one feed stream having high pressure $CO_2$ in line 606 that is injected into an intermediate compression stage, and a second feed stream having low pressure $CO_2$ in line 150 and injected at the first compression stage. As can be appreciated, such an arrangement can reduce the power demand for $CO_2$ compression in preparation for EOR or sequestration at virtually no increase in regenerator column 412 thermal load.

At least one benefit derived from the system 600 is the ability to produce a pure or nearly pure $CO_2$ stream from the regeneration column 412. The contaminants present in the $CO_2$ stream in line 410 can include water and some volatile gases (e.g., $N_2$, CO, Ar, etc.) dissolved into the circulating solvent. The system 600 can be adapted to remove essentially all of these volatile gases, leaving the regeneration column 412 overhead stream 424 with only high purity $CO_2$ and water. In one or more embodiments, the $CO_2$ concentration in the overhead line 424 can be around ⅔ of the total $CO_2$ flow in the system 600. Once separated from the water, a portion of the $CO_2$ in line 150 can be directed into a purge line 614 and captured for non-EOR uses, such as chemical feedstock, food production, etc.

As can be appreciated, embodiments and features disclosed with reference to FIGS. 5-6 can be combined without departing from the disclosure. Accordingly, the following table and supplemental information provides illustrative process data for a combination of embodiments and/or features described above. The solvent stream and gas stream reference numerals shown in the table can be referred to in FIGS. 5-6.

and captured $CO_2$ in line 150 are to be reinjected in EOR applications. As will be described below, the system 700 can be configured to allow superior integration of the cooling of purge stream 146 in conjunction with the process heat requirements in the regeneration column 412 and reboiler 419.

Figure 7:
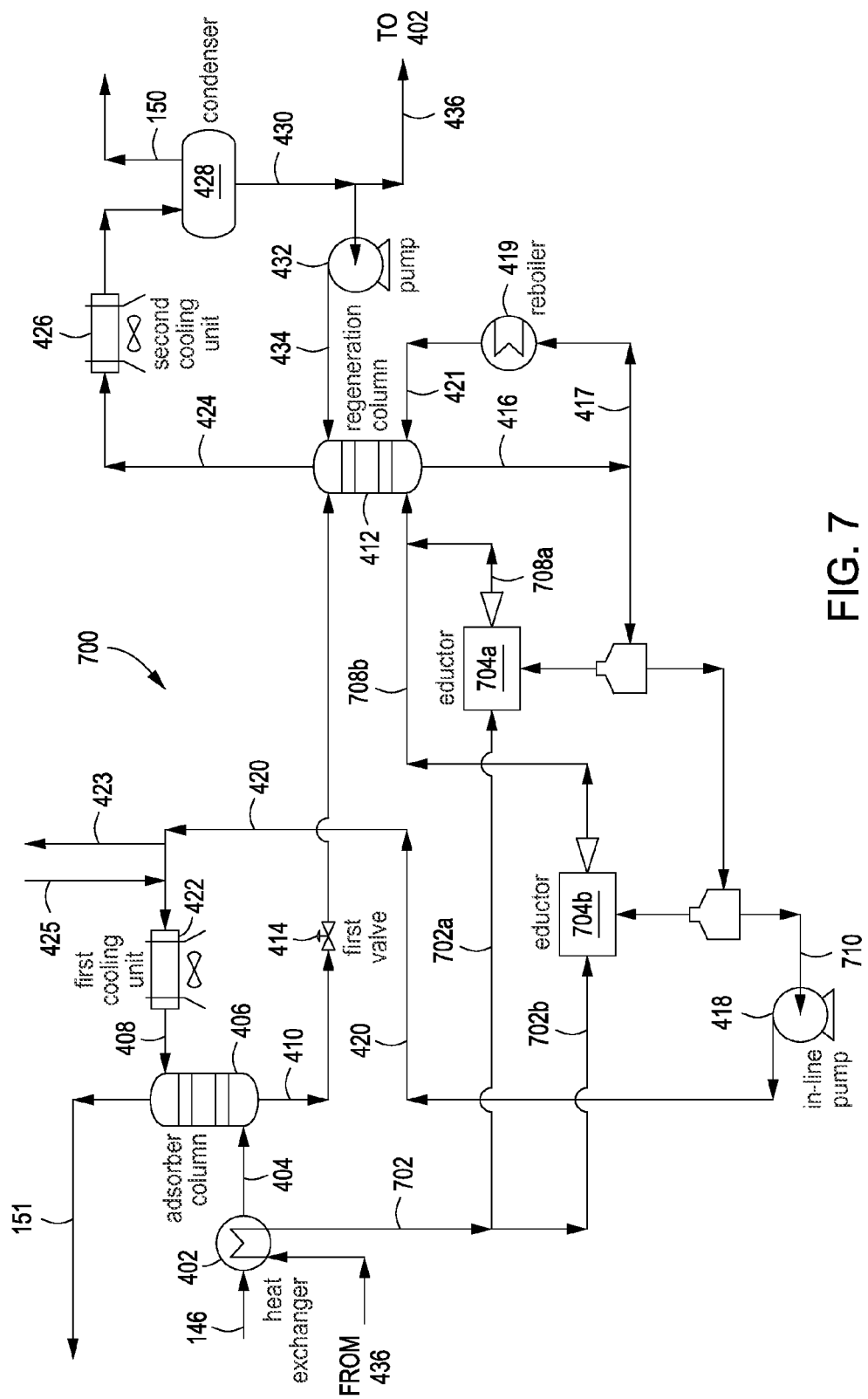
FIG. 7 depicts another illustrative $CO_2$ capture system, according to one or more embodiments of the present disclosure.

Since the residual stream 151 in the system 700 may be subsequently compressed for EOR, the heat exchanger 402 is not necessarily cross-exchanged with the residual stream 151, but instead its heat energy can be available for other uses. For example, in one or more embodiments, the heat exchanger 402 can be configured to receive at least a portion of the recovered combustion water, or wastewater from line 436 to generate a low pressure steam in line 702. The resulting steam in line 702 can have a pressure of about 50 psig or higher and can be split into lines 702a and 702b and used as motive power gas for one or more eductors 704a and 704b. While two lines 702a and 702b and two eductors 704a and 704b are shown in FIG. 7, it will be appreciated that there can be more or less, without departing from the scope of the disclosure.

TABLE 2

Process Data

| | Solvent Stream Number | | | | |
|---|---|---|---|---|---|
| | 408 | 506 | 410 | 611 | 434 |
| Temperature - °F. | 120 | 219.81 | 230.8 | 208.3 | 112 |
| Pressure - psia | 276.2 | 277.2 | 276.2 | 17.7 | 16.7 |
| Flowrate (klb/hr) | 5,079 | 14,036 | 19,988 | 19,701 | 220 |
| Flowrate (USGPM) | 8,937 | 23,757 | 33,795 | 650,017 | 443 |
| Equiv. wt % $K_2CO_3$ in solution | 35.60% | 31.80% | 31.40% | 31.80% | 0.00% |
| % $K_2CO_3$ reacted to $KHCO_3$ | 7.80% | 33.50% | 65.60% | 54.70% | N/A |
| Stream pH | 9.6 | 8.6 | 8.1 | 8.5 | 4.1 |

| | Gas Stream Number | | | |
|---|---|---|---|---|
| | 146 | 151 | 606 | 424 |
| Temperature - °F. | 803.2 | 141.62 | 120 | 112 |
| Pressure - psia | 283.2 | 276.2 | 28 | 16.7 |
| Flowrate (lbmole/hr) | 158,729 | 132,137 | 5,497 | 10,969 |
| Flowrate (MMSCFD) | 1,446 | 1,203 | 50 | 100 |
| $H_2O$ Mole % | 7.97% | 0.98% | 6.14% | 8.17% |
| $CO_2$ Mole % | 10.36% | 1.00% | 91.69% | 91.83% |
| Mole % Other ($N_2 + O_2$ + Ar + CO + $H_2$) | 81.67% | 98.02% | 2.17% | 0.00% |

Heat Required:

| | | |
|---|---|---|
| Feed Gas Cross-exchanger 402 | 629 MBTU/hr | Total: |
| Regenerator Reboiler 419 | 586 MBTU/hr (20 psig steam) | 586 MBTU/hr |

Heat Rejected:

| | | |
|---|---|---|
| Cooling Unit 608 | 114 MBTU/hr | Total: |
| Condenser 428 | 381 MBTU/hr | 1189 MBTU/hr |
| Cooling Unit 422 | 478 MBTU/hr | |
| $CO_2$ Compressor Coolers (total) | 216 MBTU/hr | |

Power Loads:

| | | |
|---|---|---|
| Gas Expander 152 (FIGS. 1-3) | 222,414 hp Produced | Total: |
| Lean Solvent Pump 418 | 2,035 hp Consumed | 165,397 hp |
| Semi-Lean Solvent Pump 504 | 5,532 hp Consumed | |
| $CO_2$ Compressor (total) | 49,450 hp Consumed | |
| Net Power Produced/Consumed | 165,397 hp Consumed | |

Referring now to FIG. 7, depicted is another exemplary embodiment of a $CO_2$ separation system 700. Since the system 700 is similar in some respects to the systems 400 and 500 described above, the entire system 700 will not be described in detail but may be best understood with reference to FIGS. 4 and 5. The system 700 can prove particularly advantageous in embodiments where the residual stream 151

In one embodiment, the eductors 704a and 704b can be configured as steam ejectors adapted to reduce the pressure on the lean potassium carbonate solvent discharged into line 416 from the regeneration column 412. To accomplish this, the lean solvent in line 416 can be directed into one or more mixing chambers 706a and 706b arranged in series and fluidly coupled to the eductors 704a and 704b, respectively.

In one embodiment, the first mixing chamber 706a can feed the second mixing chamber 706b for further processing. In other embodiments, however, the mixing chambers 706a and 706b may be arranged in parallel, without departing from the scope of the disclosure.

In operation, the eductors 704a and 704b can be adapted to accelerate the steam in line 702 to create a low-pressure zone at or near vacuum conditions configured to flash-boil the lean solvent in the mixing chambers 706a and 706b. Boiling the lean solvent can release additional water and $CO_2$ not recovered via overhead line 424 and draw the resulting gaseous effluent into lines 708a and 708b. The resulting effluent in lines 708a and 708b, can be injected into the regeneration column 412 to remove and capture the excess $CO_2$ via overhead line 424. Because of its steam content, the effluent can also serve as stripping steam, thereby supplementing or entirely replacing at least some of the regenerative boiling heat duty generally supplied by the reboiler 419. Accordingly, the system 700 can allow some of the heat held in the lean solvent to drive the vapor flow in the mixing chambers 706a and 706b, thereby reducing the net heat required for solvent regeneration and the overall size of the reboiler 419.

Flash-boiling the additional water and $CO_2$ in the mixing chambers 706a and 706b can also simultaneously cool the remaining lean solvent by reducing its pressure from about 3 psig to about 10 psig vacuum. In one or more embodiments, the temperature of the lean solvent can be reduced from about 240° F., about 230° F., or about 220° F. to about 210° F., about 200° F., or about 190° F. The cooled lean solvent can then be discharged from the mixing chamber 706b via line 710 and then directed to the in-line pump 418 which, as described above, can drive the solvent via line 420 back to the absorber column 406. Since the temperature of the lean solvent can be cooled in the mixing chambers 706a and 706b, the size of the cooling unit 422 can be reduced.

Because the low pressure steam provided in lines 702a and 702b to eductors 704a and 704b, respectively, is injected into the regeneration column 412, it can result in the consumption of at least a portion of the feedwater derived from the separated water in line 434. Accordingly, any additional water can be recovered from the regeneration column 412 via the overhead line 424 as additional wastewater. As a result, excess water can be continually building up in the system 700 and may be extracted via the wastewater line 436. As can be appreciated, the water reflux rate can be varied to maintain the solvent water balance, or the potassium carbonate solution strength.

As can be appreciated, embodiments and features disclosed with reference to FIGS. 5-7 can be combined without departing from the disclosure. Accordingly, the following table and supplemental information provides illustrative process data for an exemplary combination of embodiments and/or features described above. The solvent stream and gas stream reference numerals shown in the table can be referred to in FIGS. 5-7.

TABLE 3

Process Data

| | Solvent Stream Number | | | | | | |
|---|---|---|---|---|---|---|---|
| | 408 | 506 | 410 | 611 | 416 | 710 | 434 |
| Temperature - ° F. | 126 | 225.7 | 239.1 | 212 | 227.7 | 192.5 | 112 |
| Pressure - psia | 276.2 | 277.2 | 276.2 | 17.7 | 17.7 | 8.7 | 16.7 |
| Flowrate (klb/hr) | 4,966 | 11,380 | 17,210 | 16,866 | 5,142 | 4,966 | 64 |
| Flowrate (USGPM) | 8,749 | 20,267 | 29,088 | 642,184 | 8,643 | 8,219 | 129 |
| Equiv. wt % $K_2CO_3$ in solution | 35.10% | 32.80% | 31.80% | 32.50% | 33.90% | 35.10% | 0.00% |
| % $K_2CO_3$ reacted to $KHCO_3$ | 5.20% | 20.50% | 63.70% | 51.20% | 5.90% | 5.20% | N/A |
| Stream pH | 9.7 | 8.9 | 8.1 | 8.5 | 9.4 | 9.5 | 4.1 |

| | Gas Stream Number | | | | | |
|---|---|---|---|---|---|---|
| | 436 | 151 | 606 | 150 | 708a, b | 702a, b |
| Temperature - ° F. | 803.2 | 152.6 | 126 | 112 | 286.6 | 297.8 |
| Pressure - psia | 283.2 | 276.2 | 28 | 16.7 | 17.7 | 64.7 |
| Flowrate (lbmole/hr) | 158,729 | 132,582 | 5,387 | 11,114 | 34,169 | 24,457 |
| Flowrate (MMSCFD) | 1,446 | 1,208 | 49 | 101 | 311 | 223 |
| $H_2O$ Mole % | 7.97% | 1.30% | 7.24% | 8.17% | 99.86% | 100% |
| $CO_2$ Mole % | 10.36% | 1.00% | 90.83% | 91.83% | 0.14% | 0% |
| Mole % Other ($N_2 + O_2$ + Ar + CO + $H_2$) | 81.67% | 97.70% | 1.93% | 0.00% | 0.00% | 0% |

| Heat Required: | None (feed gas supplies all heat) | |
|---|---|---|
| Heat Rejected: | | |
| Cooling Unit 608 | 139 MBTU/hr | Total: |
| Condenser 428 | 611 MBTU/hr | 1,273 MBTU/hr |
| Cooling Unit 422 | 271 MBTU/hr | |
| $CO_2$ Compressor Coolers (total) | 217 MBTU/hr | |

TABLE 3-continued

Power Loads:

| | | |
|---|---|---|
| Lean Solvent Pump 418 | 2,047 hp Consumed | Total: |
| Semi-Lean Solvent Pump 504 | 4,473 hp Consumed | 55,992 hp |
| $CO_2$ Compressor (total) | 49,473 hp Consumed | |

Material Export

Inert Gas (primarily N2) 151    1,208 Mscfd @ 276.2 psia

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. An integrated $CO_2$ separation system, comprising:
a gas turbine system having a combustion chamber configured to substantially stoichiometrically combust a compressed oxidant and a fuel, where the compressed oxidant is air, oxygen-rich air, oxygen-depleted air, or combinations thereof;
a combustion temperature control system configured to inject at least a portion of a compressed recycle stream into the combustion chamber to generate a discharge stream and to act as a diluent to control the temperature of the discharge stream, wherein the compressed recycle stream is injected into the combustion chamber independent of the compressed oxidant;
an expander configured to expand the discharge stream to generate a gaseous exhaust stream and at least partially drive a main compressor;
an exhaust gas recirculation system having a boost compressor and one or more cooling units configured to provide a cooled recycle gas having a water component and a gaseous component to the main compressor, wherein the main compressor (i) receives substantially all of the gaseous component of the cooled recycle gas that passes through the boost compressor and (ii) compresses the cooled recycle gas and generates the compressed recycle stream, a portion of which is directed to the combustion chamber and a portion of which provides a purge stream; and
a $CO_2$ separator fluidly coupled to the purge stream, the $CO_2$ separator comprising:
an absorber column configured to receive the purge stream and circulate a potassium carbonate solvent therein to absorb $CO_2$ in the purge stream, wherein the absorber column discharges a nitrogen-rich residual stream and a bicarbonate solvent solution;
a first valve fluidly coupled to the absorber column and configured to flash the bicarbonate solvent solution to a lower pressure, thereby generating a reduced-pressure solution;
a separator fluidly coupled to the first valve and configured to receive the reduced-pressure solution and remove a first portion of $CO_2$ therefrom;
a second valve fluidly coupled to the separator and configured to receive a remaining portion of the reduced-pressure solution and flash the remaining portion to a near-atmospheric pressure, thereby generating a near-atmospheric bicarbonate solvent solution;
a regeneration column fluidly coupled to the second valve and configured to receive and boil the near-atmospheric bicarbonate solvent solution to remove a $CO_2$ and water mixture therefrom, thereby producing a regenerated potassium carbonate solvent to be recirculated back to the absorber column; and
a condenser fluidly coupled to the regeneration column and configured to receive and separate a second portion of $CO_2$ from the $CO_2$ and water mixture removed from the near-atmospheric bicarbonate solvent solution;
wherein the pressure of the first portion of $CO_2$ is higher than the pressure of the second portion of $CO_2$ and the first portion and the second portion of $CO_2$ are separately directed to a downstream compression system.

2. The system of claim 1, wherein the temperature of the purge stream is about 800° F., and the pressure of the purge stream is about 280 psia.

3. The system of claim 2, further comprising a heat exchanger associated with the purge stream, wherein the heat exchanger is a cross-exchange heat exchanger configured to reduce the temperature of the purge stream to between 250° F. and 300° F.

4. The system of claim 1, wherein the regeneration column operates at a pressure of about 3 psig.

5. The system of claim 1, further comprising a reboiler fluidly coupled to the regeneration column and configured to receive and heat a portion of the regenerated potassium carbonate solvent and produce a heated regenerated potassium carbonate solvent.

6. The system of claim 5, wherein the reboiler is configured to recirculate the heated regenerated potassium carbonate solvent back into the regeneration column to produce steam for boiling the bicarbonate solvent solution.

7. The system of claim 1, wherein the second portion of $CO_2$ is directed to a first stage of the downstream compression system and the first portion of $CO_2$ is directed to an intermediate stage of the downstream compression system.

8. The system of claim 1, wherein a portion of the water separated from the $CO_2$ and water mixture is pumped back into the regeneration column to create steam.

9. The system of claim 1, wherein a portion of the bicarbonate solvent solution is withdrawn from the regeneration column prior to complete solvent regeneration, and recirculated and fed low into the absorber column.

10. The system of claim 9, wherein 50% or more of a total amount of bicarbonate solvent solution is withdrawn from the regeneration column prior to complete solvent regeneration.

11. An integrated $CO_2$ separation system, comprising:
a gas turbine system having a combustion chamber configured to substantially stoichiometrically combust a compressed oxidant and a fuel, where the compressed oxidant is air, oxygen-rich air, oxygen-depleted air, or combinations thereof;

a combustion temperature control system configured to inject at least a portion of a compressed recycle stream into the combustion chamber to generate a discharge stream in order to expand the discharge stream in an expander, thereby generating a gaseous exhaust stream and at least partially driving a main compressor, wherein the compressed recycle stream acts as a diluent configured to moderate the temperature of the discharge stream, and wherein the compressed recycle stream is injected into the combustion chamber independent of the compressed oxidant;

at least one oxygen sensor disposed on one of an outlet or an inlet of the expander or on an outlet of the combustion chamber and operatively connected to a flow control system, wherein the at least one oxygen sensor determines a preferred amount of the oxidant to be injected into the combustion chamber by the flow control system;

an exhaust gas recirculation system having a boost compressor and one or more cooling units fluidly coupled to the boost compressor, the boost compressor being configured to receive and boost the pressure of the gaseous exhaust stream having a gaseous component and a water component and the one or more cooling units being configured to cool the gaseous exhaust stream and provide a cooled recycle gas to the main compressor, wherein the main compressor receives substantially all of the gaseous component of the cooled recycle gas that passes through the boost compressor, compresses the cooled recycle gas and generates the compressed recycle stream;

a purge stream fluidly coupled to the compressed recycle stream and having a heat exchanger configured to reduce the temperature of the purge stream and generate a cooled purge stream; and a $CO_2$ separator fluidly coupled to the heat exchanger, the $CO_2$ separator comprising:
  an absorber column configured to receive the cooled purge stream and circulate a potassium carbonate solvent therein to absorb $CO_2$ in the cooled purge stream, wherein the absorber column discharges a nitrogen-rich residual stream and a bicarbonate solvent solution;
  a first valve fluidly coupled to the absorber column and configured to flash the bicarbonate solvent solution to a lower pressure, thereby generating a reduced-pressure solution;
  a separator fluidly coupled to the first valve and configured to receive the reduced-pressure solution and remove a first portion of $CO_2$ therefrom to be injected into an inner stage of a downstream compression system;
  a second valve fluidly coupled to the separator and configured to receive remaining portions of the reduced-pressure solution and flash the remaining portions to a near-atmospheric pressure, thereby generating a near-atmospheric bicarbonate solvent solution;
  a regeneration column fluidly coupled to the second valve and configured to receive and boil the near-atmospheric bicarbonate solvent solution to remove a second portion of $CO_2$ and water, thereby producing a regenerated potassium carbonate solvent to be recirculated back to the absorber column; and
  a condenser fluidly coupled to the regeneration column and configured to receive and separate a second portion of $CO_2$ from the $CO_2$ and water mixture removed from the near-atmospheric bicarbonate solvent solution;
  wherein the pressure of the first portion of $CO_2$ is higher than the pressure of the second portion of $CO_2$ and the first portion and the second portion of $CO_2$ are separately directed to a downstream compression system.

12. The system of claim 11, wherein the temperature of the purge stream is about 800° F., and the pressure of the purge stream is about 280 psia.

13. The system of claim 12, wherein the heat exchanger is a cross-exchange heat exchanger configured to reduce the temperature of the purge stream to between 250° F. and 300° F.

14. The system of claim 13, further comprising a high pressure cooling unit configured to cool the first portion of $CO_2$ prior to injection into the inner stage of the downstream compression system.

15. The system of claim 13, wherein the second portion of $CO_2$ is directed to a first stage of the downstream compression system and the first portion of $CO_2$ is directed to an intermediate stage of the downstream compression system.

16. A method of separating $CO_2$, comprising:
substantially stoichiometrically combusting a compressed oxidant and a fuel in a combustion chamber, where the compressed oxidant is air, oxygen-rich air, oxygen-depleted air, or combinations thereof;
injecting at least a portion of a compressed recycle stream by means of a combustion temperature control system into the combustion chamber, thereby generating a discharge stream to be expanded in an expander that drives a main compressor and generates a gaseous exhaust stream having a water component and a gaseous component, wherein the compressed recycle stream moderates the temperature of the discharge stream, and wherein the compressed recycle stream is injected into the combustion chamber independent of the compressed oxidant;
increasing the pressure of the gaseous exhaust stream with a boost compressor and cooling the gaseous exhaust stream with one or more cooling units fluidly coupled to the boost compressor, whereby a cooled recycle gas comprising substantially all of the gaseous component of the gaseous exhaust stream that passes through the boost compressor is directed into the main compressor for compression, wherein the main compressor compresses the cooled recycle gas to generate the compressed recycle stream;
cooling a purge stream fluidly coupled to compressed recycle stream with a heat exchanger to generate a cooled purge stream;
directing the cooled purge stream into an absorber column having a potassium carbonate solvent circulating therein, the potassium carbonate solvent being configured to absorb $CO_2$ present in the cooled purge stream;
discharging a nitrogen-rich residual stream and a bicarbonate solvent solution from the absorber column;
flashing the bicarbonate solvent solution to a lower pressure through a first valve, thereby generating a reduced-pressure solution;
using a separator fluidly coupled to the first valve to remove a first portion of $CO_2$ from the reduced-pressure solution;
flashing a remaining portion of the reduced-pressure solution to a near-atmospheric pressure through a second valve, thereby generating a near-atmospheric bicarbonate solvent solution;

boiling the near-atmospheric bicarbonate solvent solution in a regeneration column to remove a $CO_2$ and water mixture therefrom, thereby generating a regenerated potassium carbonate solvent;

recirculating the regenerated potassium carbonate solvent back to the absorber column;

separating a second portion of $CO_2$ from the $CO_2$ and water mixture in a condenser fluidly coupled to the regeneration column, wherein the pressure of the first portion of $CO_2$ is higher than the pressure of the second portion of $CO_2$; and separately directing the first portion and the second portion of $CO_2$ into a downstream compression system.

17. The method of claim 16, further comprising increasing the temperature of a portion of the regenerated potassium carbonate solvent in a reboiler to produce a heated regenerated potassium carbonate solvent.

18. The method of claim 17, further comprising recirculating the heated regenerated potassium carbonate solvent back into the regeneration column to produce steam for boiling the bicarbonate solvent solution.

19. The method of claim 16, further comprising directing the second portion of $CO_2$ to a first stage of the downstream compression system and directing the first portion of $CO_2$ to an intermediate stage of the downstream compression system.

20. The method of claim 19, further comprising directing a portion of the water separated from the $CO_2$ and water mixture in the condenser back into the regeneration column to create steam.

21. The method of claim 16, further comprising withdrawing a portion of the bicarbonate solvent solution from the regeneration column prior to complete solvent regeneration, and feeding the withdrawn bicarbonate solvent solution low into the absorber column.

22. An integrated $CO_2$ separation system, comprising:
a gas turbine system having a combustion chamber configured to substantially stoichiometrically combust a compressed oxidant and a fuel, where the compressed oxidant is air, oxygen-rich air, oxygen-depleted air, or combinations thereof;
a combustion temperature control system to inject at least a portion of a compressed recycle stream into the combustion chamber to generate a discharge stream and to act as a diluent to control temperature of the discharge stream, wherein the compressed recycle stream is injected into the combustion chamber independently of the compressed oxidant;
an expander configured to expand the discharge stream to generate a gaseous exhaust stream and at least partially drive a main compressor;
an exhaust gas recirculation system having a boost compressor and one or more cooling units fluidly coupled to the boost compressor, the boost compressor being configured to receive and boost the pressure of the gaseous exhaust stream and the one or more cooling units being configured to cool the gaseous exhaust stream and provide a cooled recycle gas to the main compressor, wherein the main compressor receives the cooled recycle gas which comprises substantially all of a gaseous component of the gaseous exhaust stream that passes through the boost compressor and wherein the main compressor compresses the cooled recycle gas and generates the compressed recycle stream;
a purge stream fluidly coupled to the compressed recycle stream and having a heat exchanger configured to reduce the temperature of the purge stream and generate a cooled purge stream and low pressure steam; and
a $CO_2$ separator fluidly coupled to the heat exchanger, the $CO_2$ separator comprising:
an absorber column configured to receive the cooled purge stream and circulate a potassium carbonate solvent therein to absorb $CO_2$ in the cooled purge stream, wherein the absorber column discharges a nitrogen-rich residual stream and a bicarbonate solvent solution;
a first valve fluidly coupled to the absorber column and configured to flash the bicarbonate solvent solution to a lower pressure, thereby generating a reduced-pressure solution;
a separator fluidly coupled to the first valve and configured to receive the reduced-pressure solution and remove a first portion of $CO_2$ therefrom;
a second valve fluidly coupled to the separator and configured to receive a remaining portion of the reduced-pressure solution and flash the remaining portion to a near-atmospheric pressure, thereby generating a near-atmostpheric bicarbonate solvent solution;
a regeneration column fluidly coupled to the second valve and configured to receive and boil the near-atmospheric bicarbonate solvent solution to remove a $CO_2$ and water mixture therefrom, thereby producing a regenerated potassium carbonate solvent;
one or more mixing chambers fluidly coupled to the regeneration column and corresponding one or more eductors, the one or more mixing chambers being configured to receive the regenerated potassium carbonate solvent, and the one or more eductors being configured to receive the low pressure steam from the heat exchanger and flash-boil the regenerated potassium carbonate solvent to extract a second portion of $CO_2$ and water to be recirculated back to the regeneration column;
a pump fluidly coupled to at least one of the one or more mixing chambers and configured to direct a remaining portion of regenerated potassium carbonate solvent back to the absorber column; and
a condenser fluidly coupled to the regeneration column and configured to receive and separate a second portion of $CO_2$ from the $CO_2$ and water mixture removed from the near-atmospheric bicarbonate solvent solution;
wherein the pressure of the first portion of $CO_2$ is higher than the pressure of the second portion of $CO_2$ and the first portion and the second portion of $CO_2$ are separately directed to a downstream compression system.

23. The system of claim 22, wherein the second portion of $CO_2$ is directed to a first stage of the downstream compression system and the first portion of $CO_2$ is directed to an intermediate stage of the downstream compression system.

24. The system of claim 23, wherein a first portion of the water separated from the $CO_2$ and water mixture is pumped back into the regeneration column to create steam.

25. The system of claim 24, wherein a second portion of the water separated from the $CO_2$ and water mixture is directed to the heat exchanger to generate the low pressure steam.

26. The system of claim 22, further comprising a reboiler fluidly coupled to the regeneration column and configured to receive and heat a portion of the regenerated potassium carbonate solvent and produce a heated regenerated potassium carbonate solvent to be recirculated back into the regeneration column to produce steam for boiling the bicarbonate solvent solution.

27. A method of separating $CO_2$, comprising:
substantially stoichiometrically combusting a compressed oxidant and a fuel in a combustion chamber, where the compressed oxidant is air, oxygen-rich air, oxygen-depleted air, or combinations thereof;
injecting at least a portion of a compressed recycle stream by means of a combustion temperature control system into the combustion chamber, thereby generating a discharge stream to be expanded in an expander that drives a main compressor and generates a gaseous exhaust stream, wherein the compressed recycle stream moderates the temperature of the discharge stream, and wherein the compressed recycle stream is injected into the combustion chamber independent of the compressed oxidant;
increasing the pressure of the gaseous exhaust stream with a boost compressor and cooling the gaseous exhaust stream with one or more cooling units fluidly coupled to the boost compressor, whereby a cooled recycle gas comprises substantially all of a gaseous component of the gaseous exhaust stream that passes through the boost compressor is directed into the main compressor for compression, wherein the main compressor compresses the cooled recycle gas to generate the compressed recycle stream;
using at least one oxygen sensor disposed on one of an outlet or an inlet of the expander or on an outlet of the combustion chamber and operatively connected to a flow control system to determine a preferred amount of the oxidant to be injected into the combustion chamber by the flow control system;
cooling a purge stream fluidly coupled to compressed recycle stream with a heat exchanger to generate a cooled purge stream and a low pressure steam;
directing the cooled purge stream into an absorber column having a potassium carbonate solvent circulating therein, the potassium carbonate solvent being configured to absorb $CO_2$ present in the cooled purge stream;
discharging a nitrogen-rich residual stream and a bicarbonate solvent solution from the absorber column;
flashing the bicarbonate solvent solution to a lower pressure through a first valve, thereby generating a reduced-pressure solution;
removing a first portion of $CO_2$ from the reduced-pressure solution with a separator fluidly coupled to the first valve;
flashing a remaining portion of the reduced-pressure solution to a near-atmospheric pressure through a second valve, thereby generating a near-atmospheric bircarbonate solvent solution;
boiling the near-atmosphoeric bicarbonate solvent solution in a regeneration column to remove a $CO_2$ and water mixture therefrom, thereby generating a regenerated potassium carbonate solvent;
separating a second portion of $CO_2$ from the $CO_2$ and water mixture in a condenser fluidly coupled to the regeneration column, wherein the pressure of the first portion of $CO_2$ is higher than the pressure of the second portion of $CO_2$;
separately injecting the first portion and the second portion of $CO_2$ into a downstream compression system;
injecting the low pressure steam into one or more eductors fluidly coupled to one or more mixing chambers, wherein the one or more mixing chambers are configured to receive the regenerated potassium carbonate solvent;
flash-boiling the regenerated potassium carbonate solvent from the regeneration column in one or more mixing chambers fluidly coupled to one or more eductors to produce an effluent comprising a third portion of $CO_2$ and water;
accelerating the low pressure steam through the one or more eductors to extract the effluent from the one or more mixing chambers, wherein the effluent is recirculated back to the regeneration column; and
recirculating a remaining portion of regenerated potassium carbonate solvent back to the absorber column.

28. The method of claim 27, further comprising directing the second portion of $CO_2$ to a first stage of the downstream compression system and directing the first portion of $CO_2$ to an intermediate stage of the downstream compression system.

29. The method of claim 28, further comprising directing a first portion of the water separated from the $CO_2$ and water mixture in the condenser back into the regeneration column to create steam.

30. The method of claim 29, further comprising directing a second portion of the water separated from the $CO_2$ and water mixture in the condenser to the heat exchanger to generate the low pressure steam.

* * * * *